July 4, 1967     P. GRAHAM     3,328,883
DRAFTING MACHINE
Filed Dec. 29, 1965     6 Sheets-Sheet 1
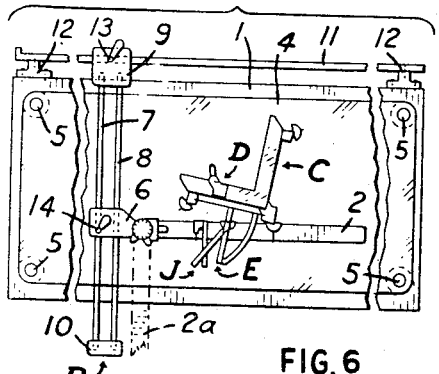
FIG. 1
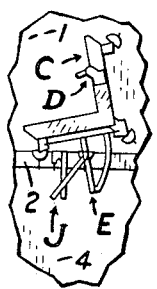
FIG. 2
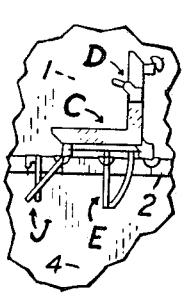
FIG. 3
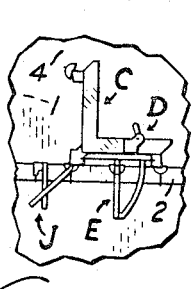
FIG. 4
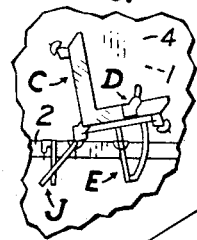
FIG. 6
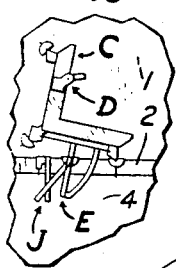
FIG. 5
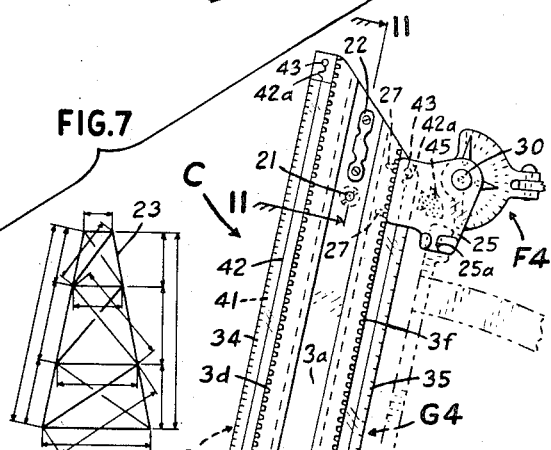
FIG. 7
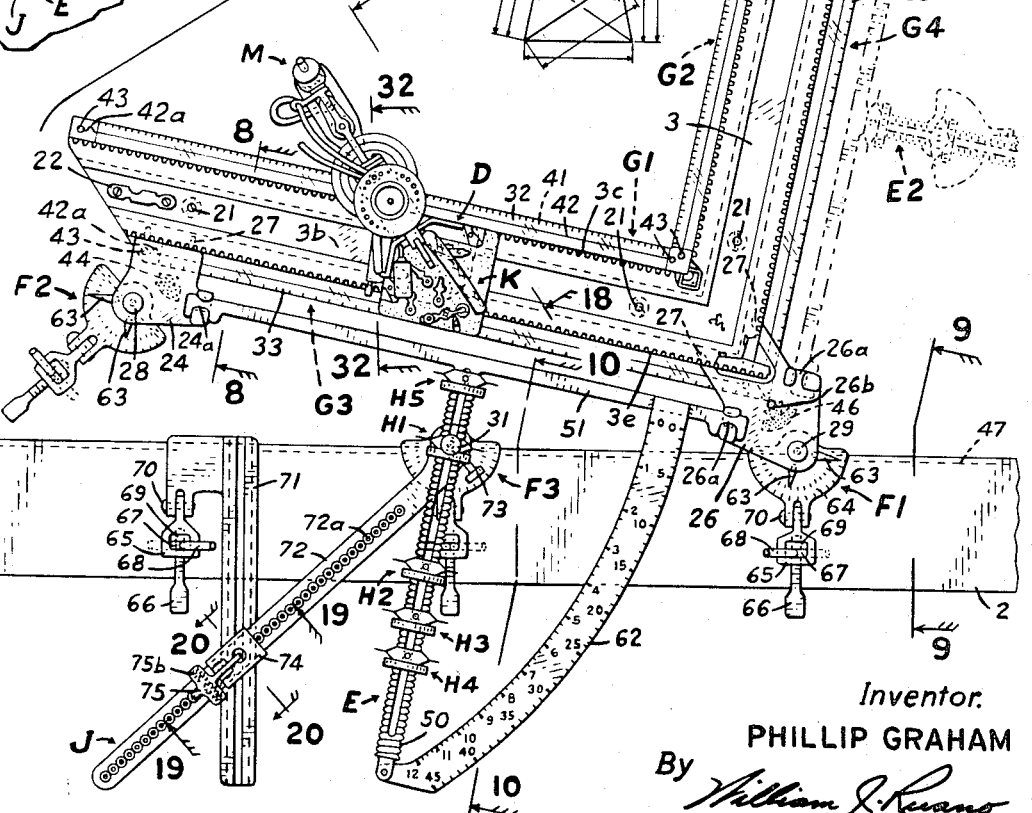
Inventor.
PHILLIP GRAHAM
By *William J. Ruano*
Attorney July 4, 1967 P. GRAHAM 3,328,883
DRAFTING MACHINE
Filed Dec. 29, 1965 6 Sheets-Sheet 2
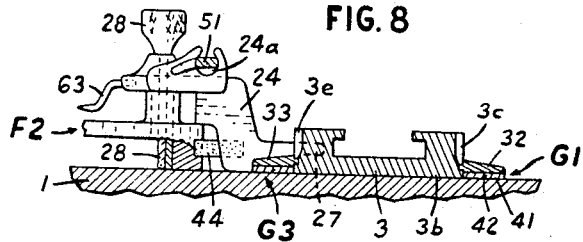
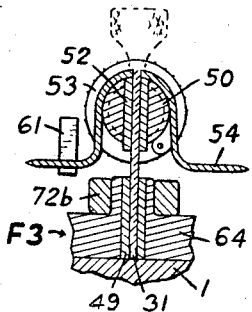
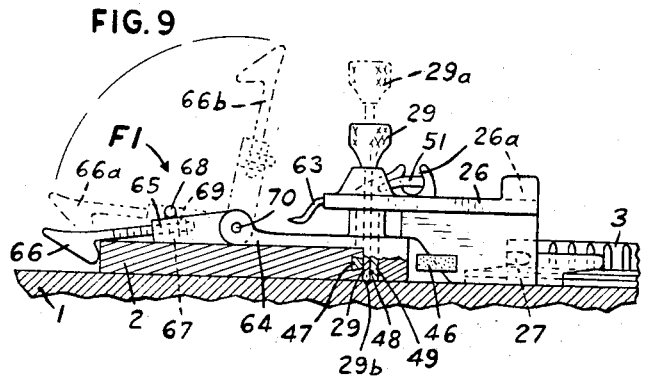
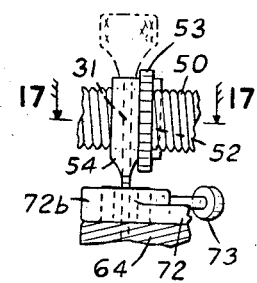
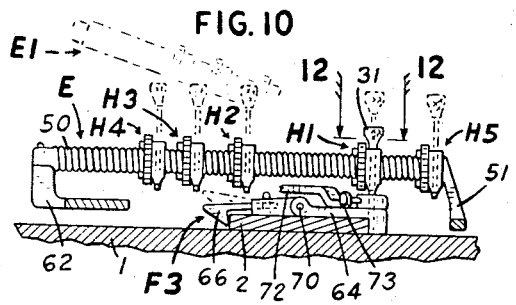
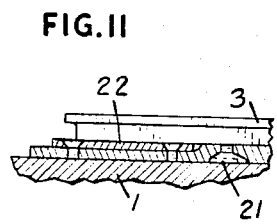
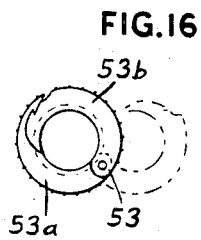
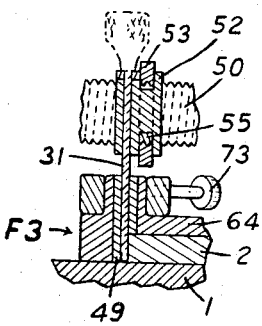
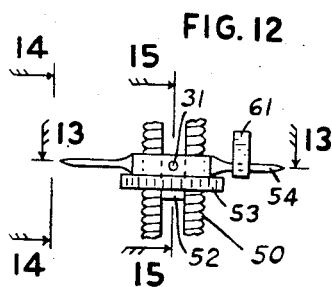
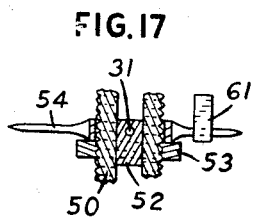
Inventor:
PHILLIP GRAHAM
By
Attorney July 4, 1967
P. GRAHAM
3,328,883
DRAFTING MACHINE
Filed Dec. 29, 1965
6 Sheets-Sheet 3
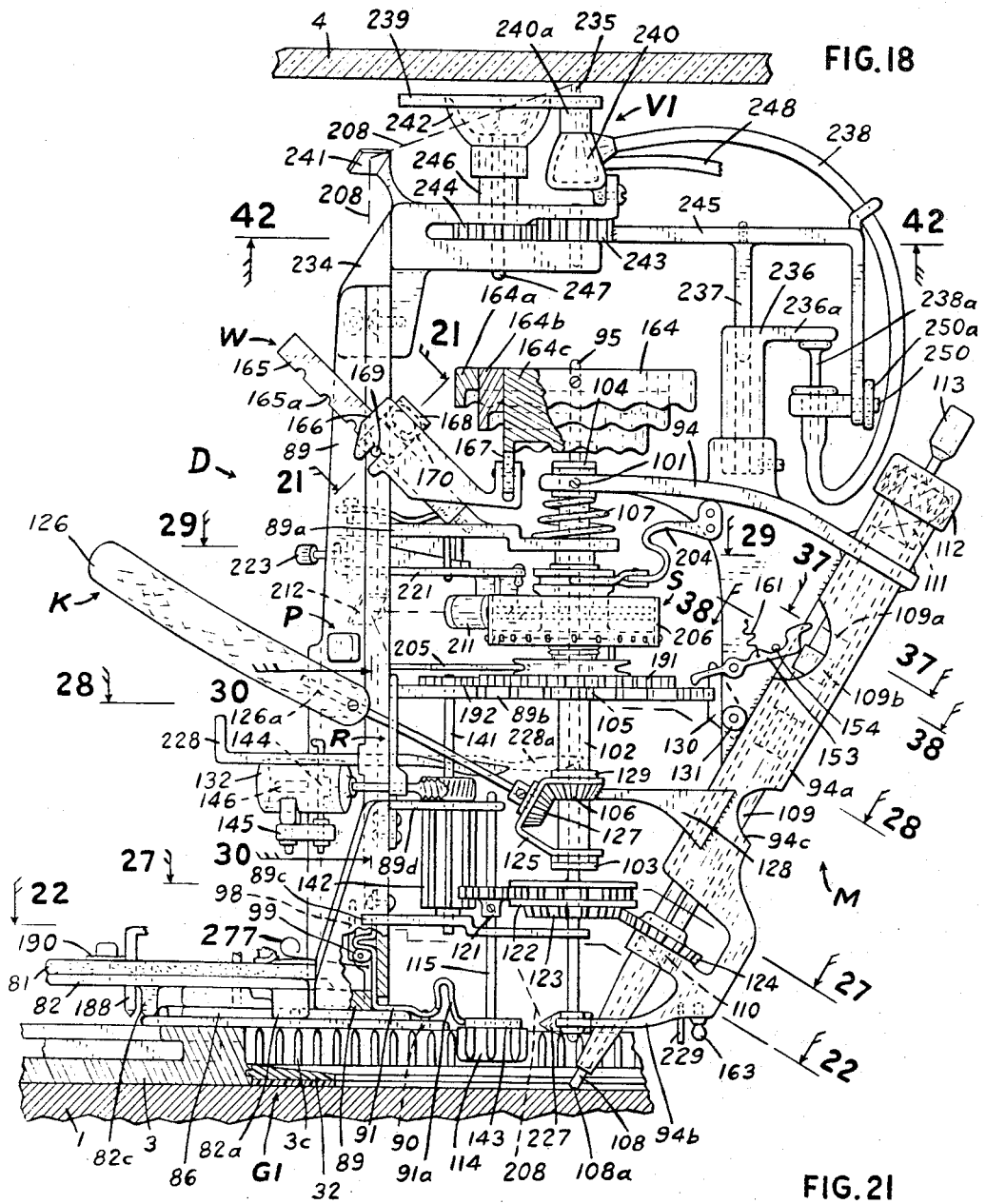
FIG. 18
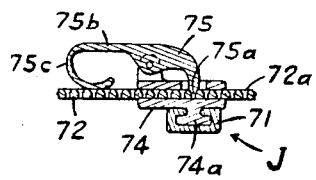
FIG. 19
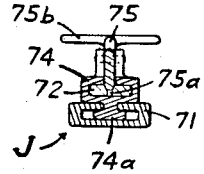
FIG. 20
FIG. 21
Inventor:
PHILLIP GRAHAM
By William J. Ruano
Attorney

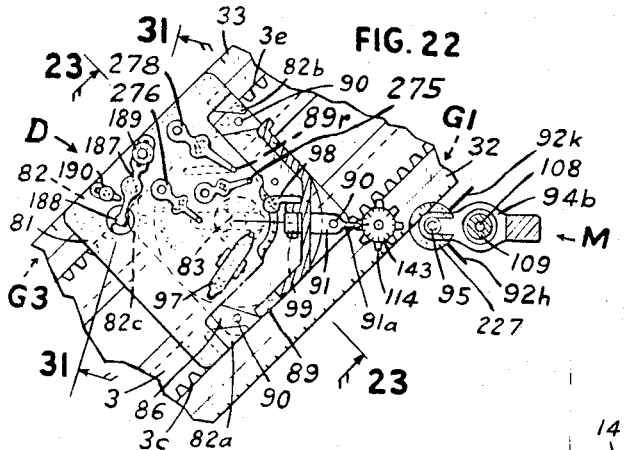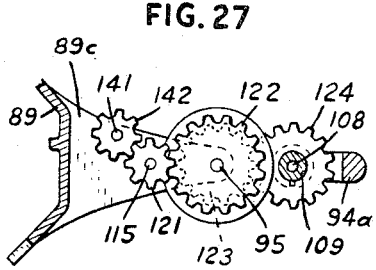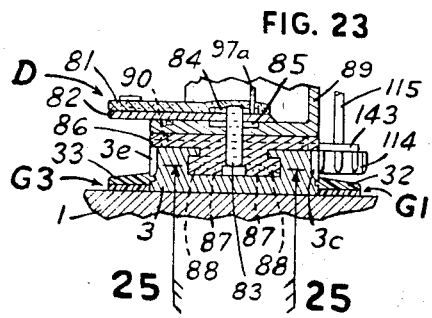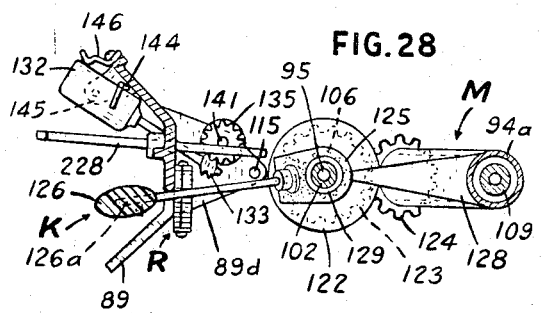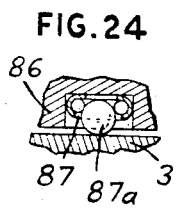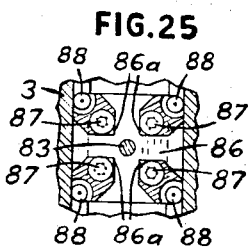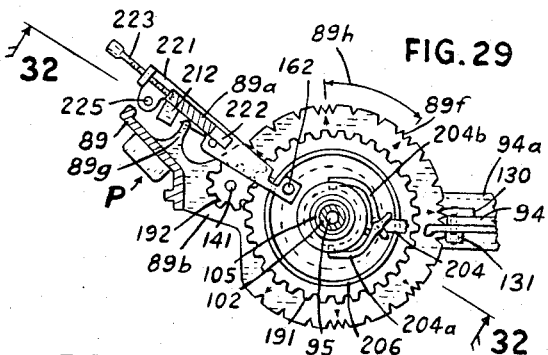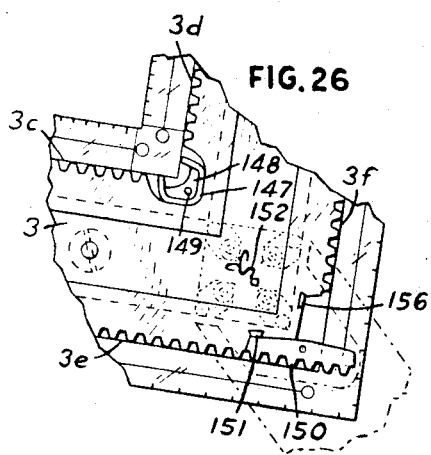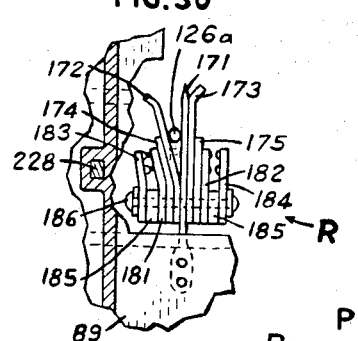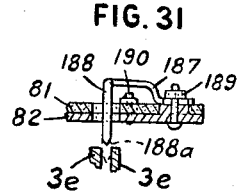

July 4, 1967 P. GRAHAM 3,328,883
DRAFTING MACHINE
Filed Dec. 29, 1965
6 Sheets-Sheet 5
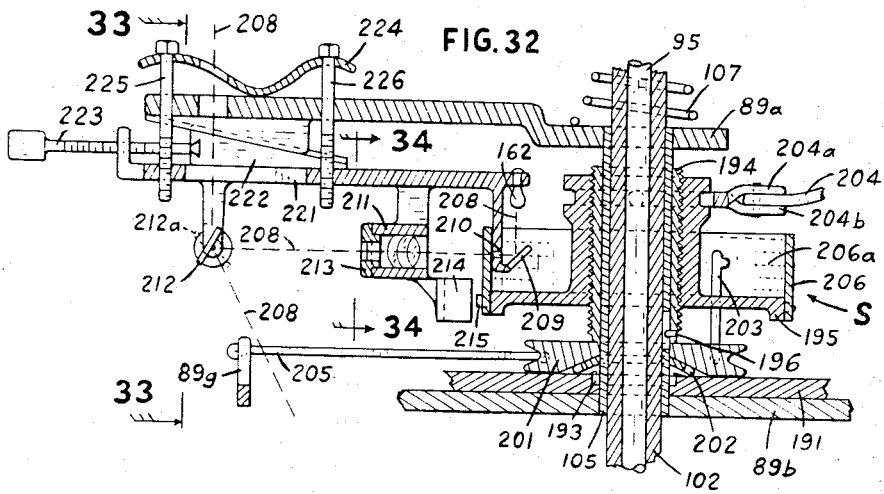
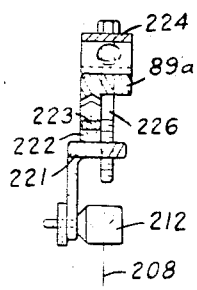
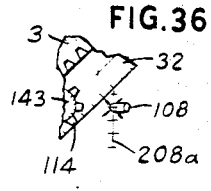
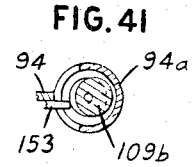
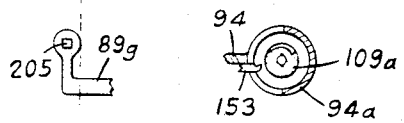
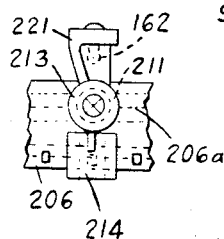
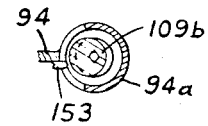
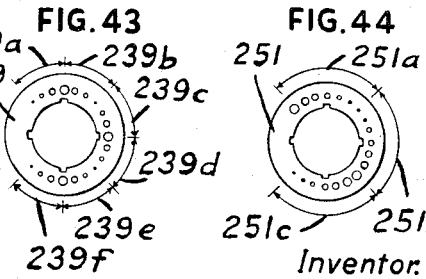
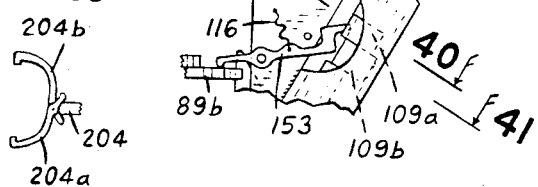
Inventor.
PHILLIP GRAHAM
By William J. Ruano
Attorney July 4, 1967 P. GRAHAM 3,328,883
DRAFTING MACHINE
Filed Dec. 29, 1965
6 Sheets-Sheet 6
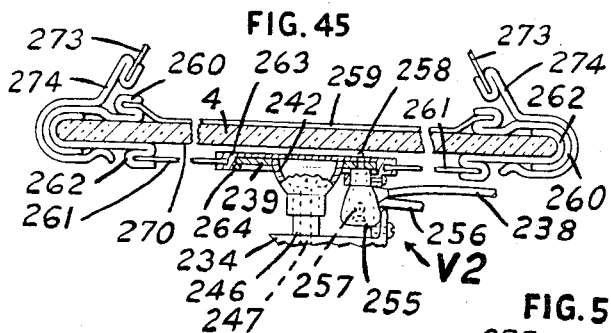
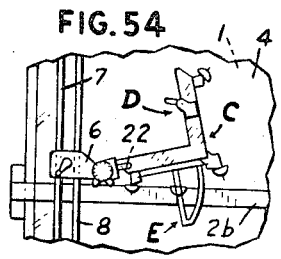
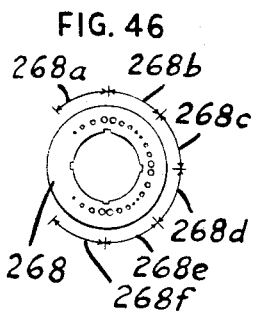
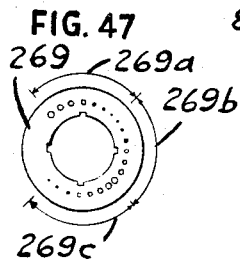
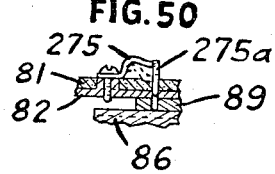
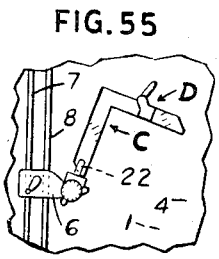
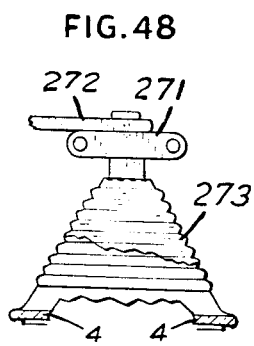
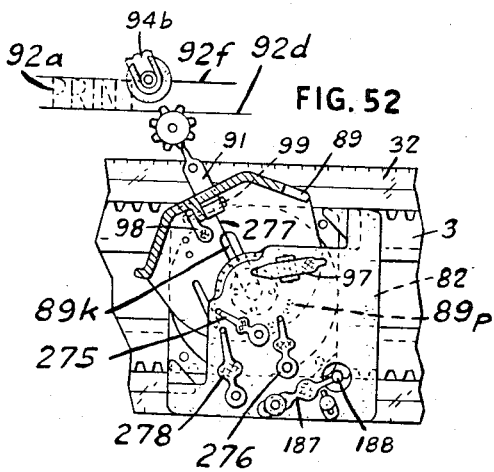
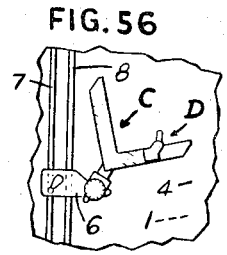
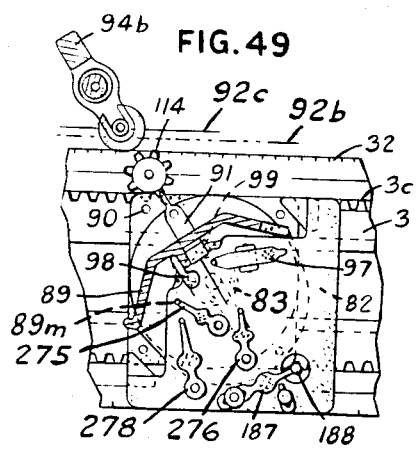
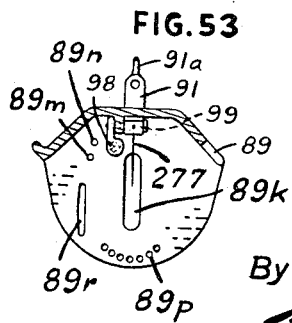
Inventor.
PHILLIP GRAHAM
By
William J. Ruano
Attorney

United States Patent Office 3,328,883
Patented July 4, 1967

3,328,883
DRAFTING MACHINE
Phillip Graham, 2823 Glenmore Ave.,
Pittsburgh, Pa. 15216
Filed Dec. 29, 1965, Ser. No. 517,232
46 Claims. (Cl. 33—18)

This invention relates to a semi-automatic drafting machine for engineering drafting work and the like to allow an engineering draftsman to rapidly, accurately, and simultaneously measure and draw precise, legible, blemish-free sketches in less time, with less skill, and with less effort than with other types of drafting equipment that could be manufactured for the same or lesser cost. This application is a continuation-in-part of my co-pending applications Ser. No. 343,179, filed Jan. 28, 1964, entitled Drafting Machine, now Patent No. 3,256,607 and Ser. No. 171,387, filed Feb. 6, 1962, entitled Drafting Machine, now Patent No. 3,226,829. Applicant also claims rights to earlier filing dates to common subject matters that are described in the present application, which were also described in his earlier applications: application Ser. No. 806,963, filed Apr. 16, 1959, entitled Graphic Machine, now Patent No. 3,120,060; application Ser. No. 364,674, filed June 29, 1953, entitled Graphic Machine, now Patent No. 2,882,604; application Ser. No. 767,157, filed Oct. 14, 1958, entitled Graphic Machine, now Patent No. 3,020,640; and application Ser. No. 221,005, filed Apr. 14, 1951, entitled Graphic Machine, which has been abandoned. The co-pending application Ser. No. 343,179 was a continuation-in-part of application Ser. No. 806,963. Application Ser. No. 806,963 was a continuation-in-part of application Ser. No. 364,674. Application Ser. No. 767,157 was a continuation-in-part of application Ser. No. 221,005. Application Ser. No. 221,005 was a divisional application of application Ser. No. 18,988, filed Mar. 17, 1948, entitled Graphic Machine, now Patent No. 2,701,417. Therefore, application Ser. No. 221,005 is entitled to the same filing date as application Ser. No. 18,988.

More particularly, the invention relates to a highly flexible machine having numerous means that coact to allow a draftsman to easily and simultaneously draw and scale precise straight lines with great accuracy and with great speed, in addition, means to draw free-hand or template guided lettering, symbols, curves and the like, also included are means to draw arcs and circles, thus the machine has the means to draw complete sketches without the use of other drafting tools and without interruptions to drawing actions. Furthermore, the invention includes means to rapidly draw a fine blemish-free ink or ink-like drawing on the underside of a drawing board. The invention includes an L-shaped square having a rack type track on which is mounted a carriage in geared relationship with the track, the carriage having a highly complex mechanism, including power means that is responsive to movements of a pencil-like shaped main control which the draftsman's hand manipulates with substantially free hand drawing movements from a hand rest on the carriage along with supplementary controls that are within finger-tip reach of the hand rest. Also included are means described in my application Ser. No. 343,179, that allows the L-shaped square to be selectively skewed to rapidly obtain opposite sets of angular positions for drawing oppositely sloped sets of lines and a selective spacer to allow the square to be shifted so as to draw uniformly spaced hatching lines and flat surface shading lines, these means coacting with improvements shown in the present application.

There is need for a drafting machine embodying the present invention to speed up and lower the cost of engineering drawing work for research and development projects, particularly the need for this means to rapidly make fine blemish-free patent drawings and the like. The flexibility of the novel device would readily allow experienced draftsmen to greatly increase their drawing speed and accuracy. In addition, the simplicity of the control means would allow trainees, frail operators, and physically handicapped draftsmen to draw rapidly and accurately with ease. Even handicapped draftsmen with only one useful hand could readily operate the machine because of the simple control means and the means to secure the machine in selective positions.

The present invention is an improvement over the complex drafting machine described in my co-pending application Ser. No. 171,387, and the complex graphic machines described in my Patents No. 2,701,417 and No. 3,020,640. The present device is far more simple in construction, less weighty, less cumbersome and far less costly to manufacture. The present device could be operated manually with far less effort or be power operated with far less power than could the complex machines described in application Ser. No. 171,387 and the two patents, because there is no beam to propel while actually drawing a line, and there is no intricate locking mechanism to operate for directional movement. In addition, because of the elimination of the beam, the present device can be propelled by using the same amount of force to draw lines that are at right angles to each other.

The drafting machine of the present invention differs from the L-shaped square drafting machine described in my co-pending application Ser. No. 343,179 by having numerous improvements, including means to rapidly and more readily draw fine ink lined or the like sketches on the underside of a drawing board that is above an inverted marking means on the carriage, to obtain cleaner and blemish-free drawings that can be readily copied with xerography means or the like to make fine reproductions; an improved L-shaped track having gear racks that coact with an improved carriage having fully interconnected gear means for its rotating driven parts including a gear that engages track rack means; the geared relationship between the track rack means and the carriage gear means provided a positive geared drive that eliminates slippage, thus causing more accurate scaling action with rotary scale means, in addition to effectively transmitting sufficient force or power to cause the rotation without slippage of the other rotatable parts of the carriage mechanism. Some of the improvements include a gear drive to cause a tilted conical tipped pencil-lead marker to rotate without slippage, a cam means to automatically make precise uniform dotted lines and other types of intermittent lines rapidly, means to automatically feed out pencil lead to replace lead that is consumed.

Another improvement includes a projected cross-hairs orienting or guiding means to indicate the point on the drawing surface that is directly in line with the center of the marker when the marker is in a retracted inactive position, to allow the draftsman to orient the marker above a starting point when the carriage is nearly at arm's length from the draftsman's eyes, so as to allow the marker to be activated more rapidly and with less skill and effort, particularly eliminating the need for a draftsman to bend forward to be very close to the drawing action.

Further improvements are automatic rotating scale means that are driven by the geared means; the scale means includes projecting scale graduation images along with the crossed-hairs image carried by a light beam onto the drawing surface adjacent to the marker to measure and register the length of a line as it is drawn. The improved measuring means automatically registers from zero at any starting position along the L-shaped square, and the improved scale means includes means to cause it to reset to zero when the draftsman raises the marker after drawing a line. A still further improvement is a reversible motor means that coacts with the geared means to propel the carriage along the full length of the L-shaped track and power to: drive a rotating marker, drive a pencil lead feeder, drive a cam means to make dotted lines and the like, and drive rotating scale means.

Another improvement is means to use the carriage marker to draw free-hand or template guided lettering, symbols, small circles and the like. Another improvement includes means to rapidly draw a plurality of selective width parallel lines without moving the L-shaped square, along with a means to draw short straight lines at right angles to intermediate portions of the edges of the square, without moving the square, thereby eliminating much of the shifting of the square, thus reducing the amount of time and effort needed to draw such lines and the elimination of much friction between the square and the drawing, thereby reducing smearing tendencies. Another improvement is a means to use the machine as a compass to rapidly and accurately draw selective width and dotted lines that form large arcs and circles. An important improvement is the pencil-like main control which is manipulated without moving the hand from a position on an improved hand-rest on the carriage, the main control co-acting with supplementary controls that are within finger tip reach of the draftsman's hand that is on the carriage.

An object of my invention is to provide a flexible semi-automatic, low cost L-shaped square drafting machine that can readily be operated rapidly with less effort, less skill, and less hand motion by a draftsman than can be done with other drafting machines of the same or lesser value—the machine having improved means to allow a draftsman to speedily, accurately, simultaneously, and continually draw and scale complete sketches, including the printing of letters, numbers and the like. Included are means to easily and quickly draw selective width lines that intersect and are at right agnles to each other, also means to make dotted lines, means to uniformly space lines and means to quickly make clean, blemish-free ink-lined drawings and the like that can be reproduced to make fine reproductions.

A still further object of my invention is to provide a novel L-shaped drafting machine that is simpler to operate, simpler in construction, and less costly to manufacture.

Other objects and advantages of my invention will become more apparent from a study of the following description taken with the accompanying drawings wherein:

FIG. 1 is a fragmentary plan view of a drawing board means with an L-shaped square drafting machine embodying the principles of this invention, positioned thereon in one of its many working positions;

FIGS. 2 to 6, inclusive, show fragmentary plan views of the drawing board means with the drafting machine illustrated in some of the possible positions other than that shown in FIG. 1;

FIG. 7 is an enlarged fragmentary plan view of FIG. 1, showing in detail some of the principles of the machine;

FIG. 8 is an enlarged fragmentary sectional elevation taken along line 8—8 of FIG. 7;

FIG. 9 is an enlarged fragmentary sectional elevation taken along line 9—9 of FIG. 7;

FIG. 10 is a fragmentary sectional elevation taken along line 10—10 of FIG. 7;

FIG. 11 is an enlarged fragmentary sectional elevation taken along line 11—11 of FIG. 7;

FIG. 12 is an enlarged fragmentary plan view taken along line 12—12 of FIG. 10;

FIG. 13 is a sectional elevation taken along line 13—13 of FIG. 12;

FIG. 14 is a fragmentary sectional elevation taken along line 14—14 of FIG. 12;

FIG. 15 is a fragmentary sectional elevation taken along line 15—15 of FIG. 12;

FIG. 16 is an enlarged detail of a typical nut used to position pin holders on an index arm;

FIG. 17 is a fragmentary sectional plan view taken along line 17—17 of FIG. 14;

FIG. 18 is an enlarged fragmentary sectional elevation taken along line 18—18 of FIG. 7, adjacent a marker carriage;

FIG. 19 is an enlarged fragmentary sectional elevation taken along line 19—19 of FIG. 7;

FIG. 20 is an enlarged sectional elevation taken along line 20—20 of FIG. 7;

FIG. 21 is a sectional view taken along line 21—21 of FIG. 18;

FIG. 22 is a fragmentary sectional plan view taken along line 22—22 of FIG. 18;

FIG. 23 is a fragmentary sectional elevation taken along line 23—23 of FIG. 22;

FIG. 24 is an enlarged sectional elevational view taken through the center of a carriage roller unit;

FIG. 25 is an enlarged fragmentary sectional view taken along line 25—25 of FIG. 23;

FIG. 26 is an enlarged fragmentary plan view showing track details at the center portion of the L-shaped square;

FIG. 27 is a fragmentary sectional view taken along line 27—27 of FIG. 18;

FIG. 28 is a fragmentary sectional view taken along line 28—28 of FIG. 18;

FIG. 29 is a fragmentary sectional view taken along line 29—29 of FIG. 18;

FIG. 30 is an elevational view taken along line 30—30 of FIG. 18;

FIG. 31 is a fragmentary sectional view taken along line 31—31 of FIG. 22;

FIG. 32 is an enlarged fragmentary sectional elevation taken substantially along line 32—32 of FIG. 7 and FIG. 29;

FIG. 33 is a fragmentary sectional elevation taken along line 33—33 of FIG. 32;

FIG. 34 is a fragmentary sectional elevation taken along line 34—34 of FIG. 32;

FIG. 35 is a fragmentary plan view showing a forked means that is spread to retract it;

FIG. 36 is an enlarged fragmentary plan view showing a projected scale and crossed-hair's image adjacent to a marking element and an edge of the L-shaped square;

FIG. 37 is a fragmentary sectional view taken along line 37—37 of FIG. 18;

FIG. 38 is a fragmentary sectional view taken along line 38—38 of FIG. 18;

FIG. 39 is a fragmentary elevational view similar to a portion of FIG. 18, but showing the marker feeding mechanism as positioned when it is actively feeding out a marker;

FIG. 40 is a fragmentary sectional view taken along line 40—40 of FIG. 39;

FIG. 41 is a fragmentary sectional view taken along line 41—41 of FIG. 39;

FIG. 42 is a fragmentary sectional view taken along line 42—42 of FIG. 18;

FIG. 43 is a plan view showing a turret with selective sized holes for an air-brush marker;

FIG. 44 is a plan view showing a different turret for the air-brush marker;

FIG. 45 is a fragmentary sectional elevation similar to the top portion of FIG. 18, but showing a light-beam marking means;

FIG. 46 is a plan view showing a turret with selective sized holes for the light-beam marker;

FIG. 47 is a plan view showing a different turret for the light-beam marker;

FIG. 48 is a fragmentary elevational view showing means to use a camera to record the sketching lines made with the light-beam marker;

FIG. 49 is a fragmentary plan view similar to FIG. 22, but showing the upper portion of a carriage positioned so as to draw a second parallel line without moving the L-shaped square;

FIG. 50 is a fragmentary sectional elevation showing a key that can be depressed to index it to maintain the carriage parts in the positions shown in FIG. 49;

FIG. 51 is a fragmentary sectional elevation showing a key that is indexed to restrain the hand-rest from pivoting;

FIG. 52 is a fragmentary plan view similar to FIGS. 22 and 49, but showing portions of the carriage positioned so as to draw free-hand printing and the like, also to draw a plurality of parallel lines without moving the L-shaped square;

FIG. 53 is a sectional plan view showing details of the base of the upper frame of the carriage and supplementary parts;

FIG. 54 is a plan view similar to FIGS. 1 and 2, but showing the square coupled differently to a conventional drafting machine track;

FIG. 55 is a plan view similar to FIGS. 1 and 54, showing the square coupled differently to a conventional drafting machine track;

FIG. 56 is a plan view similar to FIGS. 1 and 6, but showing the square coupled differently to a conventional drafting machine track.

Referring more particularly to FIG. 1, and FIG. 7, a lower drawing board 1 has a conventional-like drafting machine track or guide means B mounted on it. The board 1 may be made of any suitable materials, such as steel, wood, plastics, or glass. The track means B has a straight edge 2 to which is attached a square or L-shaped square drafting machine C, which embodies many of the principles that are new and useful. The L-shaped square C is generally referred to as a square, since that is the term used to designate similar types of squares. Most draftsmen would likely prefer to have the board 1 and the square C positioned with the drawing surface of the board being in a substantially horizontal plane, therefore, for purposes of clarity, the description recites such positioning. The board 1 and the machine C may also be used when they are tilted or positioned vertically.

The square C has a frame or body 3 which is symmetrical about its transverse horizontal axis. The body 3 is formed by legs 3a and 3b.

The square C may include a marker carriage D. The carriage D is engaged to an L-shaped track portion of the body 3. An upper drawing board 4 may be positioned above the carriage D in parallel relationship with the board 1. Four supports 5 engage the board 4, and the board 1 or the like. An inverted marking means on the carriage D is controlled so as to cause it to selectively mark on the board 4. The board 4 allows the drawing of fine ink-lined drawings and the like. The board 4 may be removed or be omitted when such fine drawings are not required. My copending application Ser. No. 171,387 describes in detail the advantages of drawing on such an upper board. The use of the upper board 4 will be described fully hereinafter.

The track means B has a protractor carriage 6. Track bars 7 and 8 form a movable track or carriage portion upon which the protractor carriage 6 is mounted. The bars 7 and 8 are fastened to a longitudinal carriage 9 and to a diaphragm 10. The carriage 9 slidably engages a longitudinal track 11. The track 11 is supported by brackets 12. The brackets 12 are fastened to the board 1 or the like. The carriage 9 has a threaded hole into which a set-screw-like lock 13 is projected. The carriage 9 can be locked to prevent it from moving along the track 11 by turning the handle of the lock 13. The carriage 6 has a hole to slidably engage the bar 7 and it has a groove to slidably engage the bar 8. The carriage 6 has a threaded hole into which the set-screw-like lock 14 projects. The carriage 6 can be locked to prevent it from moving along the track formed by bars 7 and 8 by turning the handle of the lock 14. The lock 14 can be unlocked to allow the straight edge 2 to be pivotally raised with the square C attached to it when the upper board 4 is removed or omitted, so as to allow the square C to be moved from one position to another position that is a considerable distance away, thereby eliminating smearing action caused by friction between the drawing surface of the board 1 and the bottom of the square C. The lock 13 can be unlocked to allow the track formed by the bars 7 and 8 to be pivotally raised along with the straight edge 2 and the square C when the upper board 4 is removed or omitted so as to allow the square C to be moved from one position to another position. The square C may be inverted and used against the opposite edge of the straight edge 2.

A conventional cable-rigged, parallel straight edge or the like (not shown) may be used instead of the straight edge 2 and other parts of the track means B. A conventional hinged parallelogram type of drafting machine arm as shown in my Patent No. 3,120,060, may be used instead of the track means B.

Countersunk machine screws 21 may be adjusted to project their heads slightly below the body 3 to raise the body 3 above the drawing surface so the body 3 will not rub and smear sketch lines, and to allow template guides to be partially positioned below the body 3.

Conventional drafting machine scale clips 22 allow the square C to be connected to conventional drafting machine tracks or the like, as shown in FIGS. 54 and 55. The clips 22 are positioned in recesses in the body 3. The carriage D includes semi-automatic drawing means that coact, including marking means, scaling means, power means and means to make intermittent lines, particularly dotted lines. The draftsman may use a common pencil and the like to draw along the edges of the square C without using a carriage D, or as a supplement to marking means on the carriage.

The square C can be selectively tilted or skewed with respect to the straight edge 2, to enable a draftsman to readily draw sloping lines. The term tilted is used generally in this specification to describe the tilt or skew, because the square C is shown in a tilted position in FIGS. 1, 2, 5, and 6 with respect to the so-called horizontal position of the straight edge 2.

When the draftsman uses the carriage D, as it is shown positioned in FIGS. 1 and 7, he draws along the inside edges of the square C. This arrangement allows the draftsman to draw two intersecting straight lines at right angles to each other to form a corner without moving the square C. If the draftsman prefers to draw with the carriage D along the outside edges of the square C, he may pivot the upper portion of the carriage D to position marking and scaling means adjacent to the outside edge, or the carriage D may be removed from the square C and be turned one hundred and eighty degrees to be re-engaged with the track portion of the square C.

Some right handed draftsmen may prefer to switch the drawing action so as to maintain the conventional method of drawing along the inside or upper edge of the so-called horizontal leg of the square C and along the outside or left edge of the so-called vertical leg, when the square C is positioned as shown in FIGS. 4, 5 and 6. The legs are called horizontal and vertical legs, according to their positioning. The so-called horizontal leg is the leg which is positioned substantially parallel to the drawing board edge that is adjacent to the draftsman. The so-called vertical leg is substantially perpendicular to that edge of the board and ninety degrees to the so-called horizontal leg.

The square C can be used to aid a draftsman to draw a complex sketch, such as a detail drawing of the tower design sketch 23, shown in FIG. 7. My co-pending application Ser. No. 343,179 thoroughly describes how an L-shaped square may be selectively positioned and manipulated so as to allow a sketch like sketch 23, to be drawn easily and quickly.

An index arm E holds selectively positioned pin holders H1 and the like, with pins for selectively tilting the square C. This indexing means allows the draftsman to set up the square C for maintaining all the indexed angles, or slopes, that are to be used for drawing a particular sketch such as the sketch 23. Simple operations can be made to change the indexed position back and forth for various right and left or reverse sets of angles and to the non-tilted positions. Pin arms 24, 25, and 26 are attached to the body 3 with plugs 27 engaging sockets in the body 3 so as to allow the pin arms to be removed when the carriage D is to be used to draw along the full length of the outside edges of the square C when the square is mounted directly to the carriage 6, as shown in FIGS. 54 and 55. The pin arms 24, 25, and 26 have threaded holes to take pins 28, 29, and 30. These pins may be similar to the pin 31. The pins 28, 29, and 30 form bearing points that can be made to selectively bear against the edge of the straight edge 2, to adjust the square C to various tilted positions. Normally, the pins 28, 29, and 30 are inserted fully, and allowed to remain in that position. The pins may be raised to retracted positions, like the position 29a.

The protractor-clamps F1, F2, F3, and F4 are engaged by the pins 28, 29, 30 and 31. The pins are retracted to uncouple them from the protractor-clamps. The clamps F1, F2, F3, and F4 are selectively coupled to the straight edge 2, to restrain the square C from tilting out of selective tilted or non-tilted position. These protractor-clamps may be adjusted so as to be slidable along the straight edge 2, including sliding when they are clamped to it, or they may be adjusted so they cannot slide. These clamps may be omitted when the drafting machine is to be used to a limited degree, or the clamps may be disengaged when they are not required for a lengthy sketching operation. Clamp F1, which is a typical clamp, is a self-aligning and self-coupling clamp.

The square C has transparent frame edgings 32 and 33, engaging the frame leg 3b. Similar edgings 34 and 35 engage the leg 3a.

Scale assemblies G1, G2, G3, and G4, may be positioned below transparent edgings 32 and the like. As shown in FIG. 8, scale G1 or the like has a transparent plastic scale 41, which may have a reinforcing wire 42 embedded in it. Small balls 43 are attached to the ends of the wire 42, so the scales G1 and the like may be detached or attached quickly, to sockets in the edgings. The outer end of each wire 42, has a spring portion 42a to keep the scales taut.

The pins 28, 29, and 30 may be fixed permanently to the pin arms 24, 25, and 26. The pins 28, 29 and 30 may be used without the clamps, for limited operations. The square C can be used to an extent without the pins by causing the partially embedded magnetic clamps 44, 45, and 46 to act as the outside corners or bearing points and clamps, to hold the square to the straight edge 2. A straight edge 2 that is not made of steel, may have a strip of iron 47 to coact with the magnetic clamps. These magnetic clamps restrain the square C from pulling away from the straight edge 2 while they allow the square to be slid along the edge. The magnetic clamps 44, 45, and 46 are offset from the edgings 33, and 35 so as to form projections. Two of these projections along one of the edgings 33 or 35, engage the straight edge 2 to space the adjacent edging away from the straight edge 2 when the square C is positioned against the straight edge in parallel relationship, thereby providing a gap to allow the draftsman to scale and draw within the gap. When the pins 28, 29, and 30 are used, they act as projections, thus causing the magnetic clamps 44, 45, and 46 to be inactive. The ends of the pins engage plain holes in the protractor-clamps. The pins may be magnitized to cause them to act as clamps. A resilient wire or key 48 extends through the clamp F1. The wire 48 springs aside when the pin 29 is inserted or removed. The clamp may have a hard sleeve 49.

The straight edge 2 may be pushed up and down the board 1, when the lock 13 is locked and the lock 14 is unlocked. The square C may be kept against the straight edge 2 and be slid with it and then along its length. The straight edge 2 with the square C attached to it may be moved longitudinally by unlocking the lock 13.

As shown in FIGS. 7 and 10, the pin 31 is held in the pin holder H1 that is attached to the index arm E. There is a means to selectively set or position the pin holder H1 so as to create an indexed location to obtain the desired tilted or skewed position for the square C for a drawing operation. Other identical pin holders H2, H3, H4, and H5 are shown. The holders are all attached and selectively positioned to the index arm E for the various slopes or angles required for drawing a given sketch such as the sketch 23. The pin 31 projects down so that it can be made to bear against the edge of the straight edge 2. The pin 31 is located at a position which is equidistant from the pins 28 and 29. When the pin 29 and the pin 31 bear against the straight edge 2, as shown in FIG. 7, a selective angle or bevel is created between the straight edge 2 and the leg 3b of the square C, thus positioning the square C so as to allow the drawing of the lines for the left hand leg of the tower shown in the sketch 23 or the like. After the left hand leg of the tower in sketch 23 or the like is drawn, or partially drawn, the square C may be pivoted or rocked on pin 31 until the pin 28 bears against the straight edge 2, creating the position shown in FIG. 2, which has the same degree angles that were created in the arrangements shown in FIGS. 1 and 7, except that they are the left, opposite hand or reversed. With the set-up shown in FIG. 2, the right hand leg of the tower or the like can be measured and drawn.

When the draftsman is ready to draw the horizontal and vertical lines for the tower in the sketch 23 or the like, the pin 31 may be removed or raised so that it no longer engages the protarctor-clamp F3 and the straight edge 2, or the index arm E may be removed temporarily, if desirable, particularly while consecutively drawing a great many horizontal and vertical lines. The draftsman can, if he prefers to do so, allow the index arm E to remain engaged by removing the pin and inserting it into the pin holder H5 and reinserting it into the clamp F3. The holder H5 is positioned so as not to provide a tilt to the square C, thus allowing the clamp F3 to be used to clamp the square C to the straight edge 2 when the clamps F1, F2, and F4 are omitted. The square C is positioned as shown in FIG. 3 by rocking or pivoting it until the pins 28 and 29 bear against the straight edge 2. Then the horizontal lines can be measured and drawn along the leg 3b, and vertical lines can be measured and drawn along the leg 3a.

The index arm E has a T-shape formed with a threaded arm portion 50 and a spreader portion 51, joined together. The ends of the spreader 51 have hinged connections to engage hinge sockets 24a, 25a, and 26a on the pin arms.

The index arm E is inserted from a vertical plane to allow it to fit into the hinge sockets 24a, 25a, and 26a, then it is pivoted down into a horizontal position. The arm E may be pivoted to the raised position E1 to retract the pin 31 from its engagement with the edge of the straight edge 2 while the square C is being pivoted from a tilted position to a non-tilted position.

The arm 50 is threaded and slotted to allow the pin holder H1 and the like to be attached to it and be adjusted laterally along it. The pin holder H1 has a pin retainer 52, an adjusting nut 53, an indicator 54, and an elastic lock block 55. The retainer 52 has a threaded hole. The indicator 54 is soldered to the retainer 52. The nut 53 may be formed by nut portions 53a and 53b that are hinged together, as shown in FIG. 16. The retainer 52 is inserted in the slot in arm 50 at an approximate position to where the pin 31 is to be positioned. The nut 53 is opened and clamped around the arm 50 and the retainer 52, locking the retainer to the arm 50. The nut 53 has a hook and notch engagement to lock it into a circle when the nut portions 53a and 53b are pressed together. The nut 53 is made of spring steel or the like to allow its parts to be sprung. The pin 31 is inserted into the retainer 52. The nut 53 is rotated to obtain vernier adjustment to position the retainer 52 laterally with respect to the edging 33 and thus to selectively vary the distance between the edging 33 and the pin 31 to obtain selective tilting of the square C. The top and bottom of the retainer 52 are grooved, but not threaded, to receive the nut 53. The groove and nut engage to lock the parts together. The indicator 54 has a needle pointer at each of its ends; the pointers register the tilt angle on the protractor-clamp F3. The elastic block 55 bears against a small area of the thread of the nut 53, restraining the nut from creeping. A paper tab 61 is useful to write the angular setting for a position of the pin holder H1. The pin 31 may be fastened so as to make it non-retractable from the stem 50, the index arm E, and thus stem 50 being pivoted upwards to retract the pin 31 from engagement with the edge of the straight edge 2, or the index arm E may be removed to retract the pin 31 from engagement with the straight edge 2.

A protractor 62 is attached to the arm 50 and the spreader 51. The protractor 62 may have degree graduations along its inner edge and bevel graduations along the outside edge. When the square C is tilted, as shown in FIG. 2, the degree of tilt is read accurately against the edge of the straight edge 2.

The position of the square C, as shown in FIG. 3, is the most desirable arrangement for drawing vertical and horizontal lines by a right handed draftsman. It is desirable at times, to pivot the square C to the position shown in FIG. 4, with the pins 29 and 30 bearing against the straight edge 2. A left handed draftsman would find the positions of the square C, as shown in FIGS. 4, 5 and 6, most useful.

The index arm E is moved to the position shown by the dot-dash index arm outline E2 on the leg 3a, to provide means to use the square C in the position shown in FIG. 5. The square is tilted so the pins 30 and 31 bear against the straight edge 2. The selective positioning means for the pins and straight edge means or the like that maintain the square C into a set position as it is swept over a drawing, is defined as an angular positioning means. The index is switched to allow a different set of sloped lines to be drawn, such as the lines to form the top set of bracing of the tower sketch 23 or the like. The pin 31 is removed and inserted into the pin holder H2, which is adjusted to give the proper tilt. The pin 31 is switched to holders H3 and H4 to obtain the slopes for drawing the different slopes of the center and lower bracing of the tower sketch 23 or the like.

Although I have referred to the pin 31 as being removed from the pin holder H1 and inserted in other pin holders, pins identical to the pin 31 may be inserted in all of the pin holders to make them readily available for use. When the pins are not being used, they would be kept in a raised retracted position, like the position 29a shown by a dot-dash pin outline in FIG. 9. More pin holders may be fastened to the index arm E, when additional slopes are to set-up.

The protractor-clamps F1 and the like may be omitted or be disengaged by removing or raising the pins. The indicator needles 63 point to both the angles on the protractor part 64 for the set-up on the square. The protractor 64 may be made of magnetized metal to hold it to an iron edged straight edge, also to hold the square against an iron surfaced drawing board 1. The part 64 has a hinged arrangement with a hinge part 65, and a threaded catch arm 66. The threaded shaft of arm 66 is rectangular to fit rectangular holes in hinge part 65, so the arm 66 cannot rotate.

The effective length of the arm 66 is varied to allow the clamp to fit the width of the straight edge 2. This adjustment is made by turning the threaded nut-like part 67. The nut 67 has spaced holes around its perimeter for attaching the handle 68. After the effective length of the arm 66 is adjusted to suit a particular straight edge 2, the handle 68 is inserted in one of the spaced holes in nut 67. A thin elastic washer 69 around the arm 66 prevents the nut 67 from creeping. The handle 68 is pivoted from right to left to tighten the clamp F1, and it is pivoted oppositely to loosen the clamp, to adjust for play. The handle 68 is pivoted to the extreme tightening position when it is desirable to tighten the clamp F1 so it will not slide, which is useful in keeping the square C positioned for drawing vertical lines longer than the vertical leg of the square. The hinge arrangement formed by the protractor 64 and the hinged part 65 has a machine screw 70. The screw 70 may be tightened to prevent any hinge action. The beveled end of the arm 66 and the loose hinge action, allows the arm 66 to rise and slide over the top of the straight edge 2, and then to drop to engage the straight edge 2 securely. A slightly raised fragmentary dot-dash outline 66a of the arm 66 and the hinge part 65, shown in FIG. 9, shows the elevated positions of these parts when they are sliding across the top of the straight edge 2. A highly raised retracted position of the arm 66 and the hinged part 65 is shown by a dot-dash outline 66b in FIG. 9. The index arm E, as positioned in FIG. 7, would at times, prevent retraction by hinging action of the arm 66 and the hinge part 65 on clamp F3. When that condition occurs, the pin 31 may be disengaged from the clamp F3, or from the index arm E, and the clamp F3 together to allow the square C to be selectively positioned.

A spacer J has a clamp or anchor 71 that bears against the straight edge 2 like protractor part 64 bears. Protractor-clamp parts 65, 66, 67, 68, 69, and 70 are assembled with the clamp 71 so that it can be clamped tightly or loosely to the straight edge 2 or be uncoupled. The handle 68 is manipulated to tighten the clamp 71 to prevent it from moving when drawing uniformly spaced hatching and shading lines or the like. The spacer bar 72 is a stiff member having uniformly spaced, countersunk, index holes 72a. The bar 72 has a collar-like end portion 72b which is fastened to the collar of the clamp part 64 with a set screw 73, as shown in FIGS. 14 and 15. The bar 72 may be selectively skewed to vary the angularity between it and the straight edge 2 to vary the distance from one hole 72a to the next hole, the distance being measured parallel to the edge of the straight edge 2. The protractor of the part 64 on the clamp F3 can be used to set the angularity of the bar 72 to suit a tabulation for such settings. The set screw 73 is tightened to maintain the angularity of the bar 72. The collar of the clamp part 64 may be notched or recessed every five degrees to allow the angularity to be varied by five degree units and to allow the set screw 73 to engage a notch to prevent slippage. The clamp F3 is adjusted so that it is loosely clamped, so it can slide on the straight edge 2 while drawing lines with the aid of the spacer J.

A slider 74 slides on the spacer clamp 71 and the bar 72. The broad slider bottom 74a loosely holds the slider 74 to the groove in the spacer clamp 71, as shown in FIGS. 19 and 20. The spacer control or rocker 75 is pivotally mounted on the slider 74. The control 75 has an index pin portion 75a that is engageable to the index holes 72a. The control 75 has a wide key-like portion 75b that is pressed downwardly to cause the pin 75a to retract from a hole 72a. A spring portion 75c tends to force the pin 75a into the closest hole 72a when the hand pressure is released from the key 75b. When a set of hatch lines are to be made, the draftsman tightly clamps the clamp 71 to the straight edge 2, in a position close to the loosened clamp F3, then he moves the slider 74 and the control 75 until he manipulates the pin 75c into the hole 72a closest to the clamp F3, then he draws the first line along an edge of the square. He then presses the key 75b and moves the square C to the right slightly and releases the pressure on the key 75b so the pin 75a engages the next hole 72a. Then, the next line is drawn. The spacer J may be selectively coupled to the square C. The draftsman may shift the spacer J and the clamp F3 by removing a clamp F1 or F2 and shifting the clamp F3 to its place. Such positioning of the spacer J is shown in FIGS. 3, 4 and 6.

When the spaced lines are to have a slight slope, such as a slope parallel to the edging 32, as the edge is positioned in FIG. 7, the draftsman may pivot the straight edge 2 downwardly ninety degrees to a position indicated by the fragmentary outline 2a, by manipulating the controls of the protractor on the carriage 6, then drawing the spaced lines more easily along the edging 34. The spacer J may be removed or be omitted when there is no uniformly spaced lines to be drawn.

The carriage D has means to greatly aid in measuring and drawing along the edgings 32, 33, 34, and 35. The carriage D may have a simple pencil-like shaped flexible main control K which is gripped like a pencil, is gripped and manipulated like a pencil is used, to draw free hand sketches. The control K can be used alone to a large extent to manipulate the carriage to cause a wide scope of straight line marking and scaling actions. The control K also coacts with supplementary controls to allow a wider scope of drawing work to be made, including the making of dotted or other types of intermittent lines; the making of free-hand or template guided printing and symbol characters; the making of numerous straight parallel lines without moving the body 3; and the making of short straight lines at right angles to an edging 32 and the like, without moving the square C. The carriage D may have a pivot arm M that can be selectively controlled by movement of the control K to cause marking means to make lines of selective width or lines that otherwise contrast with each other, including lines of different colors. When a draftsman grips the control K to manipulate the carriage D, he may allow a portion of his hand to bear on the hand-rest cushion 81 that is fastened to the hand-rest 82. The hand-rest 82 is fastened with a pin 83. Collars 84 and 85 that are pressed or otherwise fastened tightly to the pin 83. The carriage D has a base 86 that rolls or slides along the L-shaped track or path portion formed by the body 3. The pin 83 is press fitted to the base 86. As shown in FIG. 23, overhanging portions of the body 3 confine the base 86 to prevent the carriage D from tilting or overturning. The carriage D may ride on rollers or casters 87 to allow the carriage D to be propelled with little force. The rollers 87 may be made with very small ball-bearing units concentric about a ball 87a, as shown in FIG. 24. Wheels 88 at the corners of the base 86 may be used to take lateral thrust of the carriage D against the body 3. The wheels 88 may be made of small ball-bearing units. The base 86 may be made wholly or partially of porous bronze bearing metal, such as "Oilite" that can hold lubricating oil so the bronze acts as a fine bearing, thereby eliminating the need for wheels.

The carriage D has a frame 89 that may slide and pivot laterally about the pin 83. The pin 83 and collar 85 secure the frame 89 to the base 86. The lower portion of the base 86 is square; the extreme upper portion of the base 86 is circular in shape, as shown in FIG. 22. The corners of the base 86 are depressed. The hand-rest 82 has downwardly projecting leg-like portions 82a, 82b and 82c which rest on three corners of the base 86. There is a slight clearance between the hand-rest 82 and the frame 89, thus the weight of the hand is not transmitted through the frame 89, therefore, the frame 89 can slide easily. The hand-rest 82 is restrained from pivoting by a pin portion 97a of the key 97. The pin 97a selectively engages one of four holes in the non-rotating collar 84 as shown in FIGS. 23 and 51. Friction also tends to prevent the hand-rest 82 from pivoting. Each corner of the base 86 has an index pin 90 projecting upwardly. A resilient index bar 91 is secured to the frame 89. The outer portion of the bar 91 has a hole which selectively engages one of the index pins 90. A control handle or key 98 is pivoted downwardly to cause an eccentric 99 that is keyed to the handle 98, to raise the bar 91 to disengage it from the pin 90 to which it is engaged, to allow the frame 89 to be pivoted laterally until the bar 91 is aligned with another index pin 90 which has been selected for engagement, or to allow the frame 89 to be pivoted when making printing 92a and other line work, including drawing a plurality of parallel lines, such as lines 92b, 92c, 92d and 92f, also when drawing short lines 92h and 92k at right angles to an edging.

When the frame 89 is aligned to a selected pin 90, the handle 98 is pivoted upwardly so the eccentric 99 is rotated, which allows the bar 91 to spring downwardly and engage the pin 90. The scale indicator or outer end 91a of the bar 91 is curved to allow it to bend aside when it obstructs scale and gear means that are raised when the control K is raised.

The pivot arm M has a pivot arm frame 94. The frame 94 includes an inclined sleeve or tubular portion 94a. The frame 94 pivots laterally about the vertical axis of a shaft 95. A set screw 101 in the frame 94 engages a tube 102. The shaft 95 projects through the tube 102. A bearing collar 103 below the tube 102, and a bearing collar 104 above the tube 102, are pressed to the shaft 95 and to the tube 102 to hold the shaft 95 and the tube 102 in proper positions with respect to each other. The collars 103 and 104 may be small ball-bearing units that can take the vertical and lateral thrusts of the shaft 95. As shown in FIG. 32, a fixed tube 105 is pressed or soldered to the frame offsets 89a and 89b. The tube acts as a bearing to hold the tube 102 in position. The tube 105 may be made of porous bronze bearing metal that can retain oil. The frame offset 89c has a bearing type of hole to hold the lower portion of the shaft 95 in proper alignment. A hole in the gear 106 and a hole in the top portion of the arm frame 94 keep the arm M in proper alignment with the tube 102. The bottom portion of the shaft 95 has engagement with a bearing type of hole in the lower offset portion 94b of the tube portion 94a, to help keep the lower portion of the tube 94a in alignment.

The shaft 95 and the tube 102 are mounted so as to be movable vertically along with the arm M in response to vertical control movements of the control K. The draftsman can readily pressure the control K downwardly to depress the arm M downwardly. A spring 107 tends to raise the arm M when the draftsman discontinues downward pressure on the control K. The downward movement causes the stylus-shaped conical marker 108 to bear against the drawing surface on the board 1. The marker 108 is offset from the edging 32 so the marker tip can be readily seen while drawing and to prevent the marker from grinding against edging. There are means to cause the marker 108 to rotate. The marker 108 may be of graphite lead and the like. A conical shaped porous metal marker that releases ink through the conical surface of the marker may be used for ink type drawings. Such a porous marker is described in detail in my Patent No. 3,020,640. My Patents No. 2,701,417 and No. 3,020,640 describe rotating tilted conical tipped markers thoroughly, also other markers suitable for use with the carriage D.

The marker 108 is gripped by a mechanical pencil holder 109. Bearings 110 and 111 allow the pencil holder 109 to be rotated within the shell portion 94a. A removable cap 112 is fastened with a bayonet fitting or the like to the top portion of the sleeve portion 94a. The cap 112 restrains the holder 109 from moving upwardly out of position and it can be removed to allow the holder 109 to be removed. The holder 109 has an extension 113 which may be gripped and be turned to advance or project the marker 108 further when the tip of the marker 108 wears away to an extent. The lower portion of the holder 109 may be gripped through the opening 94c in the sleeve portion 94a when turning the extension 113. The marker 108 is rotated to dress the conical tip when it is made of pencil graphite and the like. The porous marker (not shown) is rotated to wipe ink off the conical surface to cause the ink to form lines. The marker 108 may be made to rotate by rotation of the gear 114 to which it is inter-connected. The gear 114 is keyed to the shaft 115. Holes in the offsets 89c and 89d act as bearings for the shaft 115.

A gear 121 is keyed to the shaft 115 with a set screw. The gears 122 and 123 are soldered or otherwise fastened to the shaft 95. When the arm M is raised by a movement of the control K, a flange on the gear 122 pressures the periphery of the gear 121, causing the gear 121, the shaft 115, and the gear 114 to rise. When the arm M is pressured downwardly by a movement of the control K, a flange on the gear 122 pushes the gear 121 downwardly, along with the shaft 115 and the gear 114. The beveled gear 123 drives the beveled gear wheel 124. The gear 124 is keyed or splined to the holder 109.

The pivot arm frame 94 may be gripped and be pivoted laterally two hundred and seventy degrees to allow the drawing of selective width uniform lines along the inside and outside edges of the square C. Such gripping and pivoting of the frame 94 would be difficult to accomplish. It would require considerable time, and the pivoting action would tend to cause the draftsman's hand to smear the drawing surface. The arm M may be controlled more readily by movements of the main control K which the draftsman can grip, as he can manipulate the control K and thus the arm M much faster and with less effort than would be required to grip the pivot arm frame 94 and manipulate it. The control K allows the draftsman's drawing hand to remain in position on the hand-rest cushion 81 of the carriage D while drawing and manipulating the controls.

The control K has a U-shaped member 125 which pivotally engages the tube 102. A pencil-like shaped flexible control handle 126 has the small flexible shaft 126a keyed to it with a set screw. The hub of a beveled gear 127 projects through a hole in the U-shaped member 125. The shaft 126a projects into the beveled gear 127 and the gear is keyed to the shaft with a set screw. The gear 127 engages the gear 106 that is concentric with the tube 102. The gear 106 is welded to the offset 128 of the sleeve 94a so they pivot together. The gear 106 may also be welded to the tube 102. The gears 127 and 106 are held in alignment with the U-shaped member 125. A collar 129 on the tube 102 holds the member 125 against the gear 106. A draftsman would lower or depress the control K to cause the marker 108 or the like to draw and he would raise the control K to stop the drawing action. The draftsman rotates the control handle 126 by rolling it slightly between his thumb and index finger to cause the shaft 126a and the gears 127 and 106 to rotate, thus pivoting the arm M with slight hand motion, thus allowing the draftsman's hand to maintain a position on the cushion 81 of the hand-reset 82. The draftsman's drawing hand can also manipulate other controls that are within finger-tip reach of the hand-rest 82.

The draftsman may loosely hold the control handle 126 while manipulating it to draw straight lines without sarcificing accuracy in his drawing actions, as there is an automatic pivot angle locking means to maintain the arm M in a selective pivot angle position or zone while drawing a line. As shown in FIG. 29, the pivot angle locking means includes spaced radical index notches 89f on the offset 89b, the notches are pivot angle stations. The offset 89b has six sets of pivot angle zones 89h, which are forty-five degrees each, and they are divided by arrow markings. Each zone 89h has four index notches 89f to allow four different width lines to be made. Notches 89f that are at the limits of zones are common for adjoining zones 89h. Where there are three notches adjoining each order, the two outer notches are for making selective colored lines, the common notch between zones is not used for such color line work. The wedge or tooth-like portion 130 on the arm M is selectively engaged with a notch 89f when the arm M is lowered. The engagement of tooth 130 to a notch 89f locks the arm M into a pivot angle position.

The marker 108 is rotated while drawing to constantly dress or sharpen the point into a blunt or short conical shape. The draftsman may selectively pivot the arm M to various pivot angle stations 89f, so as to draw lines of various selective uniform widths, or lines, that differ or contrast with each other, including lines of selective color, also lines that differ in width and color. This selective pivoting causes the line of contact 108a of the conical surface of the marker 108 to be selectively skewed in relation to the direction at which it travels to make a line. When the arm M is pivoted so the horizontal axis of the arm M and the marker 108 form a pivot angle of ninety degrees from the path along which a line is to be drawn, the maximum width line is drawn. When the pivot angle is zero, the narrowest type of line is drawn. The zones 89h that provide maximum pivot angles of forthy-five degrees are shown, as they would be most useful for the present machine. When a marker 108 is about one-sixteenth of an inch in diameter, a pivot angle of forty-five degrees is sufficient to make the widest lines needed for most types of drawings. A pivot angle of forty-five degree allows the draftsman to draw wide lines that are at right angles to each other without changing the pivot angle setting. When the draftsman prefers to draw selective width lines at ninety degrees to each other without raising the arm M to change the pivot angle, he may pivot the tooth 130 to retract it away from the offset 89b. A finger wheel 131 may be rotated to bind the tooth 130 to an operative position or a retracted position.

The carriage D may be power driven along the body 3 while the draftsman's drawing hand rests on the carriage D, thus eliminating manual force to propel the carriage D while drawing most straight lines. The draftsman pivots the control K laterally, slightly to the left or right to selectively position it above positions on the jack or switch R, shown in FIGS. 18 and 30. The switch R has pairs of contact prongs that are wired to an electrical power source, a control panel P and to a reversible type electric motor 132. The prongs of the switch R are selectively engaged to cause contacts to selectively power the motor 132 to cause it to rotate in one direction or to rotate in an opposite or reversed direction to thus selectively move the carriage D in either direction with power means. As shown in FIG. 28, a worm gear 133 is keyed to the shaft of the motor 132. The worm gear 133 engages a pinion gear 135. The gear 135 is keyed to the shaft 141. A gear 142 is also keyed to the shaft 141. Gear 142 engages gear 121. When the motor 132 is activated by the control K selectively engaging the switch R, the motive force from the motor 132 is transmitted through the interconnected gearing to drive or propel the carriage D, along with driving the small rotary scale 143, to cause it to rotate, driving the projecting scale S to cause it to rotate, driving the marker 108 to cause it to rotate to rub the marking element onto the drawing surface, while such driving action also dresses the marker tip and drives an automatic feeder of the marker 108. When the draftsman prefers not to use the motor 132, he may inactivate it by switching off the current at the panel P and by pivoting the handle on the eccentric 144, to cause the motor 132 to pivot laterally, thus causing the worm gear 133 to disengage from the gear 135. The worm 133 is re-engaged to the pinion 135 by pivoting the handle of the eccentric 144 to allow the spring 146 to force the motor 132 to return. The motor 132 is pivotally mounted on the bracket 145. The bracket 145 is fastened to the frame 89a. The motor 132 may be omitted if the draftsman prefers to manually work the carriage D.

The carriage D may be moved laterally with the power means without marking, so as to move the marker 108 to a new starting position. The arm M can be depressed partially so as to cause the gear 114 to engage the track rack portion 3c and to contact the switch R to a limited extent, but not to the extent that would allow the marker 108 or the inverted marker V1 to be activated.

When the arm M is lowered to the position shown in FIG. 18, the gear 114 engages the track rack portion 3c of the body 3. The rack portions may be cast, cut, or be inserted rack members. When the carriage D is moved, while the arm M is lowered, the movement causes the gear 114 to rotate. The geared engagement of the carriage D to the track racks 3c and the like, control accuracy of measurements with geared rotary scale means 143 and S, as well as to provide a means to drive the rotating elements on the carriage to synchronize them with the carriage movement along the body 3. When the arm M is lowered, all of the rotating portions of the carriage D are in geared relationship with each other and with the gear tracks on the body 3. When the carriage D is moved along the body 3 from one leg to the other leg, the gear 114 changes its direction of travel by ninety degrees. When the gear 114 engages the inner edge rack 3c and the carriage D is moved to where the gear 114 reaches the intersection of the two axii of travel, the gear 114 would tend to lock when it is engaged to the racks 3c and a rack 3d simultaneously. As shown in FIG. 26, a spring 147 is positioned at the intersection of the legs 3a and 3b to allow the gear 114 to be moved and remain in geared relationship when the direction of travel is changed by ninety degrees. The spring 147 has ends that are tooth-like in shape. A limit block 148 is centered between the ends of the spring 147, preventing the inward movement of the ends of the spring 147. The limit block 148 may be held in place by a pin 149. The spring 147 is only free to flex outwardly away from the intersection. Thus, when the gear 114 engages both ends of the spring 147, one end of the spring will yield to prevent locking, while the other end maintains geared engagement which is in the direction of travel.

When the frame 89 is pivoted laterally so the marking means and rotary scale means are switched to the outside edging 33, the gear 114 engages the outer edge rack portion 3e. When the carriage D is moved to where the gear 114 reaches the intersection of racks 3e and 3f at the two axii of travel, the gear 114 is kept engaged to the rack means by engaging the pivotally mounted short rack 150, as shown in FIG. 26. When the carriage D reaches the limit of travel to the center of the square C, lateral pressure against the carriage D causes the gear 114 to pressure the rack 150 which causes the rack 150 to pivot into alignment with the outer rack portion 3f. The rack 150 may be made of steel so as to cause its end that is in contact engagement to the track rack 3e to remain magnetically clamped to one of the powerful magnets 151 and 156 that are fastened to the rack portions 3e and 3f.

When power means are being used to propel the carriage D, the kicker spring 152 that is fastened to the center of the body 3 is compressed by the lateral force of the carriage just before the carriage D reaches the intersection. One of the pointed projections 86a on the lower portion of the base 86, shown in FIG. 25, engages the kicker spring 152. When the carriage D reaches the intersection of the legs of the square C, the force in the compressed spring 152 tends to flex the end of the spring outwardly and to kick or force the carriage D to change its direction of movement by ninety degrees and enter the track portion of the second leg. The slight carriage movement made by the carriage after it changes direction, pressures the rack 150 laterally to cause it to pivot ninety degrees until the attraction of magnet 156 causes it to remain in contact, thus providing means to allow the gear 114 to be power driven along the second leg.

The draftsman can turn the extension knob 113 while restraining the gear 124 from rotating, or he may grip the holder 109 through the opening 94c to manually feed a pencil lead type marker 108 or the like. The marker 108 may be fed automatically with feeding means, as shown in FIGS. 18 and 39, a rocker 153 coacts with a ratchet wheel-like portion 109a of the holder 109. The holder 109 has an eccentric portion 109b. The holder 109 has a conventional mechanical pencil friction clutch between the conventional upper and lower portions. The rocker 153 has a spring 161 that tends to raise the long arm of the rocker 153. When a pencil marker 108 wears down to an objectionable degree, the arm M depresses further and the short end of the rocker 153 engages the offset 89b, causing the rocker to pivot, thus depressing the long end of the rocker 153 until its pawl engages the ratchet 109a. A limit stop 154 limits the movement of the rocker 153. The rocker 153 bears against the ratchet 109a until the geared drive turns the gear 124 and the lower portion of the holder 109 until the eccentric 109b bearing against the lower outer tip of the rocker 153 forces the rocker away from the ratchet 109a, thus causing a short feeding action that feeds the marker 108 from the holder 109. This feeding action only works during the counterclockwise rotation of the holder 109. When the rocker 153 pivots towards the ratchet 109a when the holder is revolving clockwise, the pawl will not engage the ratchet 109a securely and the force would tend to bend the thin spring-like portion of the rocker 153 to thus prevent a binding action of the rocker to the ratchet.

An electrical control board or panel P may be mounted on the frame 89. The panel P may include switches to allow the draftsman to activate and deactivate the following electrically powered parts: motor 132, project scale light 162, and the illuminating light 163. The switches on the panel P may be manipulated by the draftsman's right index finger while he is gripping the main control K.

The carriage D has intermittent line means W, as shown in FIG. 18, to automatically make so-called dotted lines and other types of intermittent lines. A cam unit 164 is fastened to the shaft 95 with a set screw. The cam unit 164 may be one member or it may be formed by three cams 164a, 164b, and 164c that are coupled together. A cam follower arm 165 is mounted on the offset 89a. The arm 165 supports a follower slider frame 166. A follower wheel 167 is mounted on the slider 166. The control button plate 168 has an inverted U-shape as shown in FIG. 21. A horizontal index pin 169 is welded to the bottom tips of the button plate 168. A compressed spring 170 is trapped between the underside of the button 168 and the top of the arm 165, causing the top portion of the button 168 to be forced outwardly to an extent from the arm 165. There are four index notches 165a on the underside of the arm 165 to allow locking the index pin 169 of the slider 166 and the follower wheel 167 into selective positions to selectively engage the cams 164a, 164b, and 164c, also to engage the upper or neutral position.

When the shaft 95 rotates, the cam unit 164 rotates, the follower wheel 167 is engaged to a cam of the cam unit 164 causes vertical reciprocal motion of the arm M to cause the marker 108 to engage the drawing surface for short intermittent periods. The duration of the contact of the marker 108 with the drawing surface is governed by the cam contour. Cam 164a causes the marking means to make so-called dotted lines that consist of short dashes in equal length that are uniformly spaced. Cam 164b causes the marking means to make so-called phantom lines comprising a series of long dashes with two short dashes between adjacent long dashes. Cam 164c causes the marking means to make center lines formed by a series of long dashes with a short dash between long dashes. When a draftsman changes the position of the follower 167, he depresses the control button 168 to disengage its pin 169 from one of the index notches 165a, then while maintaining pressure on the button 168, he slides the slider 166 to another selected position and releases the pressure on the button 168 to cause the pin 169 to engage the selected notch 165a to hold the slider 166 in the selected index position. The control button 168 is closely adjacent to the main control K so as to allow the draftsman to quickly and easily manipulate the control button 168 with his right index finger while grasping the control K. The follower wheel 167 is moved to a different position while the arm M is in a raised position. The flexibility of resiliency of the control K allows the outer end of the control to be depressed by the draftsman while a cam forces the arm M upwardly as the follower wheel 167 maintains contact with a cam. The curvatures of the cam unit 164 are shallow so the gear 114 is not raised to the extent that it can disengage from the track rack means 3c and the like when the arm M rises slightly while making intermittent lines.

As shown in FIGS. 18 and 22, the small rotary scale 143 on the carriage D is tightly engaged to the top of the gear 114 or to the shaft 115, so the scale 143 rotates when the gear 114 rotates. The scale 143 has graduation markings for an inch or the like. The indicator 91a coacts with the scale 143. The scale 143 can be set with the zero graduation marking at the indicator 91a by partially lowering the arm M so the gear 114 bears slightly against the rack 3c and the like, then the carriage D can be moved slightly until the zero graduation marking lines up with the indicator 91a. Then the arm M can be raised and the carriage D can be moved to a position selected to start drawing and measuring a line. The circumference of the gear 114 is a unit such as one inch, so that one inch of movement of the carriage D causes the scale 143 to rotate once. When a long line is to be measured, the draftsman counts the number of revolutions of the marker 143 to determine the distance measured. The low cost scale 143 is highly suitable for measuring the numerous short lines that form the details of most drawings. The draftsman using the scale 143 would usually use the scales G1, G2, G3, and G4 for measuring between points when not drawing a line, also at times when drawing long lines. The scale 143 may be used to advantage to measure in either direction from any point on the square C when a non-reflective type transparent drawing surface is used and the projected scale S is not usable. The scale 143 may be removed and be interchanged with another scale such as one having graduation markings of one inch being equal to one foot. Such interchangeable scales may be made largely of soft plastic or rubber and be cut like a common lock washer is cut so it can be slipped onto and off of the shaft 115.

The switch R has a rigid center piece 171 that is fastened to the frame 89. Resilient leaves 172 and 173 are adjacent to the center piece 171. Resilient insulating leaves 174 and 175 are positioned adjacent to the leaves 172 and 173. Resilient contact leaves 181, 182, 183, and 184 have electrical contact points. Insulating leaves 185 separate the contact leaves that coact. A plastic pin or the like 186 is a non-conductor that binds the switch parts together. The draftsman makes slight selective lateral pivotal movement of the control K to the right or left before depressing it downwardly. This positioning of the control K causes the shaft 126a to engage the switch R so as to power the motor 132 so it moves in the selected direction along the L-shaped track of the square C. When the control K is pivoted to the left and lowered, the shaft 126a is lowered, as shown in FIG. 30. The shaft 126a acts as a wedge to bend the leaf 172 until it bends the leaves 174, and 181 to the extent that the contact points on the leaf 181 contact the contact points on the leaf 183, to complete an electrical circuit to cause the motor 132 to operate. The motor 132 is stopped by lifting the control K to cause the contacts to be broken. The motor 132 is activated to cause the carriage to move in the opposite direction by rotating the control K slightly to cause it to move to the right slightly, so it will be positioned above the leaf 173. Then the control K is depressed until it wedges between the center piece 171 and the leaf 173, causing contact between the contact points on the leaves 182 and 184, thereby completing a circuit to cause the motor 132 to operate in a reversed direction.

The square C, with carriage D, may be used as a compass to allow a draftsman to rapidly draw selective width lines and dotted lines to form arc and circles, particularly drawing them on the upper board 4. A pin 29 may have a hole in its bottom portion into which a conventional compass pin point 29b is inserted as indicated by the pin outline in FIG. 9. A modified one piece pin that is like pin 29, but with a compass point forming its lower extremity, may be substituted for pin 29. The pin with the compass point may be positioned on the pin arm 26 or on an end pin arm 24 or 25. A pin 29 with a compass point 29b may be inserted in a hole 26b to allow easy measuring of a radius. When a hard drawing board is used, such as a glass or steel board, a soft plastic sheet or the like may be placed on the board to allow the compass pin point 29b to grip it. The carriage D is moved to a position where the marker 108 will be positioned, which will be the selected radial distance from the compass pin point 29b. The carriage D is then locked to the selected position by depressing the resilient key 187, shown in FIGS. 22 and 31, so the pin 188 on the key engages the teeth of the track rack 3e. A phantom dot-dash pin outline 188a in FIG. 31 indicates the lower portion of the pin 188 engaging the teeth of the rack 3e. The key 188 may be adjusted laterally by loosening the nut 189 with finger force and adjusting the key 187 so that pin 188 is positioned between two rack teeth, after which the nut 189 is tightened with finger force. A slidable hold-down 190 may be moved laterally so it engages the top of the key 187 to prevent the end of the pin 188 from rising. The draftsman may hold the key 187 down with his little finger when drawing a short arc or the like.

The automatic rotary projecting scale mechanism S provides scale images on the drawing surface at the marker position without being an obstruction to drawing actions. The scale S would allow long distances to be measured easily and fully in either direction from any position on a leg of the square C. The scale S would eliminate the need to deadhead the carriage D to the zero marking at an end of a leg and it would eliminate the need to shift the square C so the zero marking on a leg is aligned with a starting point for drawing a line. The scale S includes improvements over a similar scale described in my co-pending application Ser. No. 171,387, and my Patent No. 3,020,640. As shown in FIGS. 18, 29, and 32, the scale S has a clutching arrangement with gear 191, so the scale can automatically return to a zero setting after a line is measured and the arm M is raised. The gear 191 is driven by the gear 192. A collar 193 engages a groove in the tube 105. The collar 193 restrains the gear 191 from rising. The gear 192 is keyed or otherwise fastened to the shaft 141. A threaded scale bearing 194 engages the tube 105. The tube 105 has a keyway for the key 196 on the bearing 194 so as to allow the bearing to slide vertically, but not rotate. A drum plate 195 is threadably engaged to the bearing 194 so the plate 195 can rotate. A pulley-like clutch plate 201 engages the tube 105. A curved star shaped spring 202 below the plate 201 tends to raise the plate 201. A clutch pin 203 fits a hole in the clutch plate 201. An intermediate portion of the pin 203 engages and is slidable in a hole in the drum plate 195. A spring fork 204 is supported by the arm frame 89. The fork end of the spring 204 is formed by stiffly hinged prongs 204a and 204b, which engage a groove in the upper portion of the hub of the drum plate 195. A spring 205, such as a rubber strand or a fine coiled spring, is fastened to the clutch plate 201 and to the offset 89g on the carriage frame 89. A scale drum or cylinder 206 is a translucent strip that is banded about the scale drum plate 195 to form a cylindrical shape. The scale drum 206 may be made with a strip of photographic moving picture film whose ends are cemented together or taped together with transparent tape. The drum 206 has spiral lines of scale graduate markings 206a; they form scale band images. An illuminating projection bulb 162 projects a light beam 208 to the mirror 209 that is below it. The light beam 208 is reflected from the mirror 209 through the mask opening 210 and through a small portion of a scale band image on the drum 206. Then the light beam 208 passes through a lens system 211 that magnifies it, then to the surface of a mirror 212. The mirror 212 reflects the light beam 208 onto the drawing surface adjacent to the marker 108 to form part of the image 208a, as shown in FIG. 36. A crossed hairs unit 213 is attached to the lens housing. The light beam 208 picks up the crossed hairs image 213 and projects it to the drawing surface where it forms part of the image 208a. The crossed hairs portion of the image acts as an orienting means by indicating the position on the drawing surface that is exactly below the center of the marker 108. The crossed hairs image allows the draftsman to orient the marker 108 by depressing it to start drawing action. The scale band image may have colored markings and the crossed hairs image 213 may be a different color from those on the scale band, so as to obtain contrast from sketch lines on the drawing. A horse-shoe shaped magnet 214 attached to the housing of the lens 211 is attracted to a small block of iron 215 that is attached to the drum plate 195. The magnet 214 tends to keep the zero scale setting at zero position until the carriage D is moved laterally. The magnet 214 dampens movement of the scale drum 206 when the force in the spring 205 tends to cause the scale drum 206 to return to zero position after a line is drawn. The scale S is coupled to the driving means to allow it to start measuring when the arm M is depressed to start drawing and measuring a line as the spring 204 forces the drum plate 195 and the threaded bearing 194 downwardly so the bearing 194 engages the clutch plate 201 and this action forces the plate 201 to partially flatten the lower spring 202, then to bear against the scale driving gear 191. When the scale S is so clutched and the carriage D is moved laterally, the driving gear 191 rotates the clutch plate 201. The scale finger or pin 203 transmits this rotating movement to the scale drum plate 195 which causes the scale drum 206 to rotate. The scale drum 206 moves upwardly or downwardly slightly as it rotates because of its threaded engagement with the threaded bearing 194, thus causing a spiral scale band image on the scale band drum to register through the mask opening 210. The rubber strand 205 stretches and wraps around the groove in the clutch plate 201 as scaling action takes place. When the arm M is raised the rubber strand 205 forces the drum 206 to rotate back to its original or zero position. The magnet 214 dampening the tendency of the drum 206 to oscillate before stopping at the zero position. The spiral scale band images and the threading to cause spiraling action is an improvement over the projected scale means of my Patent No. 3,020,640, as the spiral scale band 206a can be made so that it encircles the drum 206 numerous times, thus allowing longer lines to be measured. When scaling action is not wanted, such as when tracing, the draftsman spreads the fork prongs 204a and 204b which have spring washer means where they are riveted to the spring bar 204 so as to make a stiff hinge.

When the carriage D moves and the drive causes the scale drum 206 to rotate, the rotation causes the drum 206 to move towards or away from the clutch 201 because of the threaded engagement between the bearing 194 and the drum plate 195. The bearing 194 slides vertically but it does not rotate as it is keyed to the tube 105 with a key 196. The projection light 162, mask 210, lens 211, crossed hairs 213, and mirror 212 are supported by the adjustable frame 221. A wedge 222 is moved laterally to adjust the frame 221 vertically to a selected scale band 206a. The head of the screw 223 that dovetails into the wedge 222 is rotated to bring one of a series of scale bands on the drum 206 into registry with the mask 210. A spring 224 tends to force the frame 221 upwardly by means of the spring pressures against the underside of each of the vertical machine screws 225 and 226. The film of drum 206 has minute scale band images 206a, as the images can be enlarged in the projection by the lens 211. The spiraling movement of the drum 206 allows the scale bands 206a to be longer than the circumference of the drum 206. When the arm M is raised, the spring 204 lifts the threaded sliding bearing 194 and raises the scale wheel 195, drum 206, and allows the spring 202 to lift and thus disengages the clutch plate 201, allowing it to rotate to return the drum 206 to the zero scale position.

A draftsman views the marker 108 and the drawing area adjacent to the marker 108 at an angle from either side of the carriage D, thus the rotary scale mechanism S and the intermittent line mechanism W do not block the draftsman's viewing path.

The draftsman may use the plastic magnifying lens 227 which is located on the arm portion 94b. The magnifying lens 227 is notched and grooved so it may be slipped onto and off of the arm portion 94b. The lens 227 allows the draftsman to draw a sketch to a smaller scale. The light beam 208 passes diagonally and clear of the lens 227 so the lens does not distort the projected scale image 206a.

As shown in FIGS. 18 and 28, a slidable hold-down 228 may be pushed towards the tube 102 until the beveled end of the hold-down engages the collar 129 and forces the arm M to a lower position and keeps it there while drawing a very long line, or when using the drafting machine as a beam compass. The draftsman can manipulate the hold-down 228 readily with his thumb to push the hold-down 228 into engagement or to pull it out of engagement. The hold-down 228 may have a thin resilient intermediate portion, as shown, to allow it to maintain downward pressure and to allow it to flex when making dotted lines automatically. A phantom dot-dash outline 228a indicates the engaged position of the hold-down.

The illuminating light 163 may be used to supplement the drawing room lighting to prevent objectionable shadows in the vicinity of the marker 108. The light 163 would have a mask or filter screen 229 to prevent intense light from blotting out or dimming the projected scale image 208a on the drawing. A "Polaroid" screen means may be used to control the screening of the light.

An electric cable (not shown) would be plugged into a power source to furnish power for the carriage D.

The carriage D may include an inverted air-brush marker V1. A frame 234 supports the air-brush. The marker V1 is used to draw lines on the underside of the upper board 4. The air-brush V1 is responsive to movements of the control K and the arm M to select the pivot angle 89f of the selective width of line means and the like, and the means to activate and to stop the flow of the stream of marking spray ink 235 and the like. An inverted marker V1 and the like may be used alone to mark, the the lower marker 108 being removed or otherwise deactivated, or the lower marker may be used as a tracer or follower to trace over a preliminary drawing to cause identical movements of the air-brush marker V1. A ball point pen (not shown) may be interchanged with the conical marker 108 to trace and mark over the white lines of a blue print when the lower marker or tracer does not have to make selective width lines. The gear 124 may be removed when using a ball point pen and the like.

A rigid tube 236 is fastened with a set-screw to the arm 94. The tube 236 has a hole to fit the slidable finger 237. An offset 236a engages and depresses the plunger 238a of the control cable 238 when the arm M is lowered. The control cable 238 turns on the air-brush V1 when its plunger 238a is depressed, and the air-brush V1 is shut off when the arm M is raised. The control cable 238 is similar to a common camera cable release. The diaphragm turret disk 239 pivots to align a selective diaphragm or opening to the nozzle 240a of the air-brush portion 240. Thus, when the arm M is depressed or lowered, the downward movement activiates the air-brush marker 240 by the depressing of the control cable plunger 238a, which action opens the valve means of the air-brush 240 to cause the marking spray 235 to spray to form inked lines. When the arm M is raised, the plunger 238a springs upwardly causing the cable attached to it to retract and close the airbrush valve means.

As shown in FIGS. 32 and 18, the carriage D has means to divert the light beam 208 that carries the projected scale image and the crossed hairs image so that it can be projected onto a coated drawing surface on the underside of the upper board 4 for use when the draftsman watches the sketching on the upper board 4 through the board 4 when the board is translucent or when he watches reflections of the lower surface of board 4 that reflect from a mirror type surface on or adjacent to the lower board 1. A round nut is loosened to allow the mirror 212 to be pivoted to the position indicated by the dot-dash outline 212a to allow the light beam 208 to carry the images to the upper board 4. The mirror 212 reflects the images to a higher mirror 241 which reflects the images to the upper board 4 at the center of the vertical axis of the spray of ink 235. The light beam 208 passes through the transparent hub 242 of the air-brush VI. The hub 242 supports the diaphragm disk 239. The disk 239 is pivoted laterally with gears 243 and 244 to bring selective sized diaphragms into registry with the nozzle 240a to make selective width lines. Gear 243 is welded or otherwise fastened to the offset 245. Gear 243 engages gear 244. Gear 244 is keyed to sleeve shaft 246. A fixed shaft 247 keeps shaft 246 aligned. The disk 239 is pressed onto the hub 242. Tube means 248 carries air to the air-brush portion 240. When an upper marker V1 and the like is to be inactive for a long period, the plunger support 250 is loosened by turning its nut 250a and then pivoting the support ninety degrees.

As shown in FIG. 43, the turret disk 239 has six pivot angle zones 239a, 239b, 239c, 239d, 239e and 239f. Each zone has four different diameter diaphragm openings. Adjacent zones have a common diaphragm opening. The arm M would be selectively pivoted to notches 89f in a zone 89h that would correspond to the selected zone and diaphragm opening in the disk 239. The arm M would preferably be pivoted so that zones 239c and 239f would be used when drawing along the edgings 32 and 33 when a conical marker 108 is used. Zones 239a and 239d would preferably be used when drawing along the edgings 34 and 35 when a conical marker 108 is used. Zones 239b and 239e may be used effectively when drawing a plurality of parallel lines, also when drawing letters and numbers when the frame 89 is pivoted as shown in FIG. 52.

An interchangeable diaphragm turret disk 251 may be used when a wider range of selective lines are to be drawn. The disk 251 has zones 251a, 251b and 251c that are ninety degrees each. Each zone has seven different diaphragm openings that correspond to the notches 89f in two adjoining zones 89h. The disk 251 would be useful when the width of lines made with the lower marker 108 or a ball point pen is immaterial, while the selective lines means accurately controls the marker V1.

The inverted marking means may be a light-beam type of marker V2 as shown in FIG. 45. The light-beam marker V2 may be interchangeable with the air-brush marker V1, as the support means and the control means to make lines that contrast with each other, particularly lines that have selective width, is largely the same for the air-brush V1 and the light-beam marker V2. The light-beam marker V2 has a light unit 255, an electric cable 256 that is connected to a power source and to the control panel P. The light unit 255 has a small electric light bulb 257, which may have a condensing lens (not shown) to concentrate the light. The control cable 238 is attached to a switch in the light unit 255. When the control K is lowered, the control cable 238 would turn on the switch and cause the light bulb 257 to produce a light-beam 258. The different sized holes or diaphragms in the turret disk 239 or the like, would regulate the diameter of the light-beam 258 that is projected onto a coating on the board 4. The board 4 may have a photo-sensitized sheet attached to its upper or lower surface, or a surface of the board 4 may be coated with a photo-sensitized solution. An opaque sheet 259 may be clamped to a translucent board 4 with resilient curved edging 260 as shown in FIG. 45 to keep out stray light from above. A highly elastic opaque sheet 261 may be clamped to the underside of the board 4 with resilient curved edging 262. An opaque rigid shield or screen 263 confines the disk 239 to prevent stray light from passing through the turret disk 239 and the transparent hub 242. The shield 263 is secured to the disk 239 with a resilient wire ring 264. The shield 263 is secured to the light unit 255 with a set screw. The shield 263 has a hole that is aligned with the light beam 258. The disk 239 rotates within the shield 263. The elastic screen 261 is attached to the shield 263. When the light-beam marker V2 is to be inactive for a long period, the plunger support 250 may be loosened and rotated ninety degrees to deactivate the marker, or the power for the bulb 257 may be switched off at the control panel P.

The light-beam marker V2 would allow the making of lines on a sensitized sheet or coating that would be equal to inked lines for making reproductions. The sensitized sheet may be coated with silver photographic solution or the like. The sensitized coatings may be the type usable for xerography processing, wherein the light-beam 258 changes the polarity of carbon coated areas that it strikes, to form the reproduction image. Such carbon covered area may be above the board 4, with suitable means to fix the image.

The light-bear marker V2 would be most useful when a marker 108 or the like is used to trace over the white lines of a blueprint of a preliminary drawing on the board 1, while the light-beam marker V2 clearly marks the sensitized sheet or coating. With such usage, the marker 108 or the like acts primarily as a guiding element to follow the sketch lines and to mark off the lines on the blueprint as they are traced.

Fine multi-color lined engineering drawings can be made easily and quickly with the light-beam marker V2 projecting different colors onto a color sensitized photographic sheet. Lines that differ in color are lines that contrast with each other effectively. A disk 239 may be used for color work, by fastening a thin colored filter over the zone 239a and a different colored filter over the zone 239f. The arm M may be selectively pivoted to cause the marker V2 to make four different width lines of one color with zone 239a, and four different width lines of a second color with zone 239f. The marker V2 can be used most effectively to make multi-color lined drawings by using a color turret disk 268 or a color turret disk 269. The disk 268 has color zones 268a, 268b, 268c, 268d, 268e and 268f. Each zone is covered with a different colored filter. The disk 269 has color zones 269a, 269b and 269c, each of which is also covered with a different colored filter. Disks 268 and 269 do not have a common diaphragm opening for adjoining zones. The two outer notches of each group of notches 89f are used in conjunction with disks 268 and 269. Each zone of the disk 268 has four different sized diaphragm openings. Each zone of the disk 269 has seven different sized openings. The marker V2 can thus be used to draw lines that contrast with each other by being different in width, by being different in color, or by being different both in width and color.

A ball point pen marker that does not need to make selective lines may be used as a lower marker. When it is desirable to have the lower marker make colored lines that are the same color as those being marked with marker V2, interchangeable colored ball point pens can be inserted as needed.

When facilities are not available or not adequate for handling a large sensitized photographic sheet 270 that is attached to the lower or upper surface of the upper board 4 as shown in FIG. 45, or when large sensitized sheets of paper or film, particularly color sheets, are too costly for the contemplated usage, the light-beam 258 may be projected onto a frosted-glass-like coating that is on the lower or upper surface of the board 4 and be copied with a camera 271, as shown in FIG. 48. The camera 271 may be mounted on a support 272 that is above the board 4. The shutter of the camera 271 is opened when the light-beam V2 is being used, so as to record the light pattern formed by the light-beam 258. A bellows or light-proof screening 273 may be used as shielding from stray light. The bellows 273 may be clamped to the board 4 with resilient curved edging 274, to keep out stray light. The opaque sheet 259 would be removed from the board 4 before the bellows 273 are attached. The camera 271 may be the type that uses 35mm film, including color film and microfilm.

As shown in FIG. 49, the carriage D may remain in geared relationship with the track rack portion 3c and the like while drawing and scaling two parallel lines that are adjacent to each other and to an edging 32 or the like without moving the square C, thus eliminating friction between the drawing on the board 1 and the square C. After a line 92b is drawn by using the carriage D while the carriage parts are positioned as shown in FIG. 22, the index bar 91 is disengaged from a pin 90 by pivoting the handle 98 downwardly, then by manipulating the control K so as to pivotally move the frame 89 clockwise to a slight degree, while moving it backwardly slightly towards the draftsman's hand until the far end of the slot 89k engages the pin 83. The slot 89k is shown clearly in FIG. 53, along with other perforations in the frame 89. After so moving the frame 89, one of the draftsman's fingers engages and depresses a key 275, shown in FIG. 50, which causes the pin portion 275a to engage a hole 89m in the frame 89, thus the marker 108 is positioned so as to allow the line 92c to be drawn. The pin 275a slides in a round hole in the hand-rest 82. The hole 89n is used to index the parts when the frame 89 is pivoted oppositely so as to allow a second line that is similar to line 92c to be drawn along the edging 34 or the like.

The means to draw two parallel lines that are close together, would be highly useful, as there is frequent need to draw two lines to indicate thicknesses of materials, including widths of pipes, in addition, two lines may be drawn to indicate a pair of wires.

As shown in FIG. 52, the control K may be manipulated to pivot and slide the frame 89 laterally, to use the carriage D to draw free-hand printing 92a and the like, or to follow templates to make more precise letters, numbers, symbols, small circles, irregular curves and the like. The index bar 91 is disengaged from the pin 90 by pivoting the handle 98 downwardly, then by moving the control K so as to pivotally and slidably move the frame 98 in movement patterns to form letters, numbers and the like. The motor 132 causes the marker 108 to rotate to dress the conical point while printing, and the motor also powers the marker feeder while printing. The means shown in FIG. 52 allows printing, symbols and the like to be made easily on the upper board 4, so that a complete sketch can be drawn on the board 4 with the carriage D. A draftsman may momentarily lock the carriage D to the track rack means while drawing letters, numbers, symbols and the like. The key 187 may be pressed down by the draftsman's little finger while he is drawing one or two letters, then the pressure on the key 187 is released to allow the carriage D to be moved a short distance along the track before drawing another letter or the like. A draftsman may keep his wrist stiff and move only his fingers to make lettering and the like without locking the carriage D to the track rack means.

Guide lines 92d and 92f for lettering and the like, as shown in FIG. 52 may be drawn without moving the square C, by manipulating the control K after disengaging the index bar 91 from a pin 90 with a movement of the handle 98. The draftsman pushes the frame 89 outwardly with the control K until the near end of the slot 89k engages the pin 83, then the frame 89 is pivoted laterally by manipulations of the control K until the marker 108 is approximately positioned where a line is to be started, such as the line 92f which is to be drawn, then the key 276 is pressured downwardly with one of the draftsman's fingers, then the control K is pivoted laterally slightly until the pin on the key 276 engages and projects into one of the group of seven index holes 89p in the frame 89. The key 276 and the coacting parts are like the key 275 and other parts shown in FIG. 50, including a round pin hole in the hand-rest 82. When the pin of the key 276 projects into a hole 89p, the frame 89 is locked so that it cannot pivot, thus allowing a straight line to be drawn a considerable distance away from the edging 32 or the like. The holes 89p are arcuately spaced about the pin 83. There are calibrated markings along the rounded corner of the hand-rest 82, which coact with the wire indicator 277 to indicate the distance from the marker 108 to the edging 32 or the like. The indicator 277 is hinged to the frame 89 so that it can pivot vertically. The motor 132 furnishes the power to rotate the marker 108 to allow the parallel lines 92d, 92f and the like to be made selective in width, and the motor drives the cam 164 to allow such parallel lines to be made dotted and the like. Dimension lines that are similar to lines 92d and 92f may be drawn readily without shifting the body 3.

Extension lines that are like the short lines 92h and 92k shown in FIG. 22, may be drawn readily without moving the body 3. Extension lines tie dimension lines like line 92d to features or limits on a sketch. A line 92h and the like may be drawn at right angles to the edging 32 or the like from any point along the edging. A similar line 92k may be drawn anywhere along the edging 33.

A line 92h can be drawn by pivoting the handle 98 downwardly so as to disengage the index bar 91 from a pin 90, then by depressing the key 278 with a finger, so pin on the key 278 engages a slot 89r that is in the base of the frame 89. The key 278 and the coacting parts are like the key 275 and other parts shown in FIG. 50, including a round pin hole in the hand-rest 82. When the pin of the key 278 projects into the slot 89r, the frame 89 can pivot slightly as the control K is pushed outwardly with the pin of the key 278 sliding in the slot 89r to guide the marker along a path to make a line 92h. When the motor 132 is being used, the control K is not lowered until the frame 89 is moved out to where the gear 114 clears the rack 3c. When the control K is then lowered, the motor dresses and feeds the marker 108. A gap is created between a line closely adjacent to the edging 32 and such an extension line as line 92h. Such a gap is desirable as a gap is considered good practice between an object line and an extension line. The square C may be shifted slightly after drawing a center line, so that numerous short transverse center lines that are similar to line 92h, may be drawn to indicate the centers of fasteners and the like.

The square C may be attached directly to the protractor-carriage 6, as shown in FIG. 54. A T-square 2b or the like may be used to quickly and accurately aid in tilting or skewing the square. The T-square 2b may be slid aside after a conventional protractor setting lock on the carriage 6 is locked to maintain the square C in a selected tilted position.

The square C may be used without the T-square 2b, the index arm E and the pin arms, by using only the protractor on the carriage 6, the carriage D can be used to mark along the full lengths of both the inside and the outside of the square.

The square C may also be attached as shown in FIG. 55 to allow the carriage D to be used to measure and mark along the full lengths of both the inside and the outside of the square.

The center of the square C may be attached to the carriage 6 as shown in FIG. 56, by using the socket holes that were described for use to allow a pin arm 26 to be attached. The mounting of the square C as shown in FIG. 56 reduces the amount of deflection of the square C when the square C is raised when moving it over the board 1, when the board 4 is removed.

While I have shown an L-shaped square C with a carriage D, a modified but less useful machine may be made by eliminating the leg 3a, thus having the single leg 3b with the carriage D mounted on it. The leg 3b may be used to draw lines at right angles to each other by pivoting the leg ninety degrees with the aid of the track means B or the like.

Since the engineering draftsmen and others who could use the present invention, work in fields that differ in scope, it is obvious that all the elements shown in the drafting machine would not be needed by all the users. There are obviously many useful sub-combinations of the elements shown; particularly sub-combinations without motor, rotary scale, spacer means, and inverted marking means.

Although, I have shown gear means for driving rotating parts, plain friction wheel means such as those shown in my co-pending application Ser. No. 343,179, may be used instead of gears to provide a machine that would be limited in accuracy.

While I have illustrated and described certain specific embodiments of my invention, it will be understood that these are by way of illustration only and that various changes and modifications will be readily suggested to those skilled in the art after having had the benefit of the teachings of the present specification, but which are within the contemplation of the present invention and within the scope of the claims.

I claim:

1. A drafting machine comprising support means, upper board means mounted thereon and having drawing surface means thereon, a second board spaced from and below said upper board means, an L-shaped square means mounted on said second board below said upper board means, said L-shaped square means including two legs, said L-shaped square means also including an L-shaped track means, carriage means mounted on said L-shaped track means, said carriage means being a single carriage, marking means mounted on said carriage means, said marking means including at least an inverted marking element mounted on an upper portion of said carriage means adjacent said upper board means, control means mounted on said carriage means, said marking means being responsive to said control means for drawing on said upper board means, whereby a draftsman can draw rapidly with ease while keeping said drawing surface means clean and unsmudged.

2. A drafting machine as recited in claim 1 together with means, associated with at least said inverted marking element, responsive to said control means to effect the drawing of selective lines which contrast with each other, whereby a fine and clean drawing can be made rapidly with ease on said drawing surface means.

3. A drafting machine as recited in claim 1 together with means, associated with at least said inverted marking element, responsive to said control means to effect the drawing of lines of selective width on at least said upper board means, whereby a fine and clean delineation can be made rapidly and with ease on at least said drawing surface means on said upper board means.

4. A drafting machine as recited in claim 3 wherein at least said inverted marking element is an ink dispensing marker, whereby a fine inked drawing can be made on at least said upper drawing board means, rapidly without being soiled with drippings and without delays to allow ink to dry.

5. A machine as recited in claim 3 wherein at least said inverted marking element is an air brush, whereby a fine inked drawing can be made on at least said upper drawing board means, rapidly, without being smeared or being soiled with drippings and without said lines being made irregularly by foreign particles from said drawing surface means.

6. A machine as recited in claim 3 together with means to automatically draw intermittent lines in response to said control means, whereby fine uniform intermittent lines can be drawn rapidly with ease.

7. A machine as recited in claim 3 together with scale means mounted on said carriage means, means for zero setting said scale means in response to said control means, said scale means including means to measure the length of a line as it is drawn, whereby fine accurately proportioned sketches can be drawn rapidly without interruptions for scaling.

8. A drafting machine as recited in claim 3 wherein said carriage means includes means to use said inverted marking element to draw freehand and template guided characters in response to said control means, whereby fine complete unsmudged sketches can be drawn rapidly with continuous drawing action.

9. A drafting machine as recited in claim 3 wherein said carriage means includes means to draw a plurality of lines parallel to each other and in parallel relationship with the longitudinal axis of the adjacent one of said legs while said L-shaped square means remains in a set position, whereby little motion is required to draw numerous lines on said upper board means.

10. A drafting machine as recited in claim 3 wherein said carriage means includes transverse drawing means responsive to said control means to draw a short line at right angles to an intermediate portion of one of said legs while said L-shaped square means remains in a set position, whereby short extension lines and center lines can be drawn rapidly with ease.

11. A drafting machine as recited in claim 3 wherein said drawing surface means includes a light sensitive surface comprising photographic reproduction means, and wherein said inverted marking element includes a source of light for emitting a light-beam, said light-beam being projected onto said drawing surface means to obtain said lines, whereby fine lines for technical drawings can be drawn rapidly without delay to service said marking element.

12. A drafting machine as recited in claim 3 wherein said drawing surface means includes a light sensitive surface comprising photographic color reproduction means, and wherein said inverted marking element includes a source of light and selective color filter means, said source of light emitting a light-beam projecting through said color filter means onto said drawing surface means to obtain said lines, whereby different colored and different width lines for technical drawings can be drawn rapidly.

13. A drafting machine as recited in claim 3 wherein said marking means includes a lower marking element, and wherein said second board has a sketching surface, said lower marking element marking said sketching surface simultaneously with said inverting marking element marking said upper board means in response to said control means, whereby said lines on said sketching surface indicate that similar said lines have been drawn on said upper board means.

14. A drafting machine comprising an L-shaped square means, said L-shaped square means including two legs, said L-shaped square means having an L-shaped track means, said L-shaped track means being formed by intersecting straight track portions, a carriage means mounted on said L-shaped track means, said carriage means being a single carriage, a marking means mounted on said carriage means, control means mounted on said carriage means, said marking means being responsive to said control means, said carriage means including means to use said marking means to draw free-hand and template guided characters in response to said control means, whereby lettering and symbols can be drawn rapidly with ease.

15. A drafting machine as recited in claim 14 wherein said marking means includes selective means to make lines which contrast with each other, whereby fine complete drawings can be made rapidly.

16. A drafting machine as recited in claim 14 wherein said marking means includes a marking element having a substantially conical tip rotatable about its own axis and being supported at an acute angle with respect to a drawing surface, so as to provide line bearing contact therewith along the entire length of the conical surface of said tip, said carriage means including means to cause said marking element to rotate when said carriage means is moved, said marking element being pivotable laterally in response to said control means, whereby lines of selective width can be drawn rapidly.

17. A drafting machine as recited in claim 16 wherein said marking element is made of material that wears off said conical tip and forms a deposit on a drawing surface to form said lines and wherein said marking means includes a feeding means that intermittently and automatically feeds said marking element towards said drawing surface to compensate for said wear, whereby said marking means can be used continuously.

18. A drafting machine as recited in claim 14 wherein said marking means includes means to make lines of selective width, whereby easily readable drawings can be made easily.

19. A drafting machine as recited in claim 18 together with means to automatically draw intermittent lines in response to said control means, whereby fine uniform intermittent lines can be drawn rapidly and easily.

20. A drafting machine as recited in claim 19, together with compass means, whereby arcuate lines can be drawn rapidly with ease.

21. A drafting machine as recited in claim 18 wherein said carriage means includes transverse drawing means responsive to said control means to draw a short line at right angles to an intermediate portion of one of said legs while said L-shaped square means remains in a set position, whereby short extension lines and center lines can be drawn with little motion and effort.

22. A drafting machine as recited in claim 18 wherein said carriage means includes means to draw a plurality of lines parallell to each other and in parallel relationship with the longitudinal axis of the adjacent one of said legs while said L-shaped square means remains in a set position, whereby little motion is required to draw numerous lines that are substantially blemish-free.

23. A drafting machine as recited in claim 18 together with scale means mounted on said carriage means, means for zero-setting said scale means in response to said control means, said scale means including means to measure the length of a straight line as it is drawn.

24. A drafting machine as recited in claim 22 together with means to automatically draw intermittent lines in response to said control means, whereby lines can be drawn rapidly with ease.

25. A drafting machine as recited in claim 22 wherein said carriage means includes transverse drawing means responsive to said control means to draw a short line at right angles to an intermediate portion of one of said legs while said L-shaped square means remains in a set position, whereby many lines can be drawn with little motion and whereby lines would tend to remain clear and unsmeared.

26. A drafting machine as recited in claim 25 together with means to automatically draw intermittent lines in response to said control means, whereby numerous intermittent lines can be drawn rapidly.

27. A drafting machine as recited in claim 18 wherein said control means includes a control handle for gripping by a draftsman, and wherein said last named means is responsive to a predetermined movement of said control handle to preselect said width, to lowering movement of said control handle to initiate drawing action, and to raising movement of said control handle to terminate said drawing action.

28. A drafting machine comprising an L-shaped square means, said L-shaped square means including two legs, said L-shaped square means having an L-shaped track means, said L-shaped track means being formed by intersecting straight track portions, a carriage means mounted on said L-shaped track means, said carriage means being a single carriage, a marking means mounted on said carriage means, said carriage means including a wheel means engageable with said L-shaped track means, said carriage means including motor means interconnected with said wheel means, means at the intersection of said two legs to enable said carriage means to make a right angle turn while maintaining positive engagement of said wheel means with said track means in response to the force of said motor means, whereby intersecting straight lines can be drawn with ease.

29. A drafting machine as recited in claim 28 wherein said wheel means includes rotary scale markings so that movement of said carriage means causes said scale markings to rotate to indicate the length of line drawn along said L-shaped track means, whereby lines can be drawn and scaled simultaneously and rapidly with ease.

30. A drafting machine as recited in claim 28 wherein said carriage means includes means to draw a plurality of parallel lines in parallel relationship to the longitudinal axis of one of said legs while said L-shaped square remains in a set position, whereby less motion and effort are used to draw lines which tend to remain clear and unsmeared.

31. A drafting machine as recited in claim 28 wherein said carriage means includes intermittent line means interconnected with said motor means to cause said marking means to draw intermittent lines, whereby said intermittent lines can be drawn with little effort.

32. A drafting machine as recited in claim 28 wherein said marking means includes selective means to make lines which contrast with each other, whereby lines that are easily distinguished from one another can be drawn rapidly with ease.

33. A drafting machine as recited in claim 28 wherein said marking means includes means to make selective width lines, whereby lines that differ in width can be made rapidly with ease.

34. A drafting machine as recited in claim 33 wherein said carriage means includes means to draw free hand and template guided characters, whereby finely delineated printing and symbols can be made rapidly with ease.

35. A drafting machine as recited in claim 33 wherein each of said legs includes at least one longitudinal edge, and wherein said carriage means includes means to draw a short selective width line at right angles to an intermediate portion of one of said edges while said L-shaped square remains in a set position, whereby little motion and effort are used to draw a plurality of short parallel lines which tend to remain unsmeared.

36. A drafting machine as recited in claim 33 together with control means, said control means includes a control handle for gripping by a draftsman, and wherein said last named means is responsive to a predetermined movement of said control handle to preselect said width, to lowering movement of said control handle to initiate drawing action, and to raising movement of said control handle to terminate said drawing action.

37. A drafting machine as recited in claim 28, wherein said marking means includes a marking element having a substantially conical tip, rotatable about its own axis and being supported at an acute angle with respect to a drawing surface, so as to provide line bearing contact therewith along the entire length of the conical surface of said tip, said motor means interconnected with said marking element to cause said marking element to rotate, said marking element being pivotable laterally in response to control movements, whereby lines of selective width can be drawn rapidly with ease.

38. A drafting machine as recited in claim 37 wherein said marking element is made of material that wears off said conical tip and forms a deposit on said drawing surface to form said lines and wherein said marking means includes a feeding means that is interconnected with said motor means, said feeding means includes means to intermittently and automatically feed said marking element towards said drawing surface to compensate for said wear, whereby said marking means can be used continuously to draw said selective width lines.

39. A drafting machine as recited in claim 28 wherein said L-shaped track means includes rack means and wherein said wheel means includes gear means in geared relationship with said rack means, whereby said carriage means is moved with positive traction.

40. A drafting machine comprising an L-shaped square means, said L-shaped square means includes two legs, said L-shaped square means having an L-shaped track means, said L-shaped track means being formed by intersecting straight track portions, said track portions include rack means, a carriage means mounted on said L-shaped track means, said carriage means being a single carriage, a marking means mounted on said carriage means, said carriage means including gear means engageable with said rack means, said carriage means including rotary scale means, said rotary scale means being interconnected with said gear means, said track means including means at the intersection of said two legs to enable said carriage means to make a right angle turn while maintaining positive engagement of said gear means with said track means, whereby lines can be scaled accurately while being drawn.

41. A drafting machine as recited in claim 40 wherein said rotary scale means includes means to project a lightbeam to carry a scale image to a surface adjacent to said marker, whereby marking and scaling action can be viewed simultaneously with ease.

42. A drafting machine as recited in claim 40 wherein said marking means includes means to make selective width lines, whereby said selective width lines can be scaled accurately as they are drawn.

43. A drafting machine as recited in claim 40 wherein said carriage means includes intermittent line means, said intermittent line means including gear means interconnectable with said rack means, whereby uniform intermittent lines can be drawn and scaled rapidly with ease.

44. A drafting machine as recited in claim 43 wherein said marking means includes means to make selective width lines, whereby said selective width lines can be scaled accurately as they are drawn.

45. A drafting machine as recited in claim 44 together with control means, said control means includes a control handle for gripping by a draftsman, and wherein said last named means is responsive to a predetermined movement of said control handle to preselect said width, to lowering movement of said control handle to initiate drawing action, and to raising movement of said control handle to terminate said drawing action.

46. A drafting machine as recited in claim 40, said marking means including a marking element having a substantially conical tip rotatable about its own axis and being supported at an acute angle with respect to a drawing surface, so as to provide line bearing contact therewith along the entire length of the conical surface of said tip, said marking element including gear means interconnected with said rack means to cause said marking element to rotate when said carriage means is moved, said marking element being pivotable laterally in response to control movements, whereby lines of selective width can be drawn with ease while being scaled accurately.

References Cited
UNITED STATES PATENTS

| | | | |
|---|---|---|---|
| 2,336,626 | 12/1943 | Mott et al. | 33—23 |
| 2,571,196 | 10/1951 | Bucknam et al. | 33—23 |
| 2,793,471 | 5/1957 | Kurata et al. | 33—32 |
| 3,067,517 | 12/1962 | Matson | 33—26 |
| 3,119,184 | 1/1964 | Projansky | 33—25 |

LEONARD FORMAN, *Primary Examiner.*

H. N. HAROIAN, *Assistant Examiner.*